US008162360B2

(12) United States Patent
Takaya et al.

(10) Patent No.: US 8,162,360 B2
(45) Date of Patent: Apr. 24, 2012

(54) DOOR STRUCTURE OF AUTOMOTIVE VEHICLE

(75) Inventors: Hirotaka Takaya, Hiroshima (JP); Kohji Takada, Hiroshima (JP); Toyohiko Kobayashi, Hiroshima (JP); Noboru Shono, Hiroshima (JP)

(73) Assignee: Mazda Motor Corporation (JP)

( * ) Notice: Subject to any disclaimer, the term of this patent is extended or adjusted under 35 U.S.C. 154(b) by 1132 days.

(21) Appl. No.: 12/013,565

(22) Filed: Jan. 14, 2008

(65) Prior Publication Data

US 2008/0185850 A1 Aug. 7, 2008

(30) Foreign Application Priority Data

Feb. 5, 2007 (JP) ................................ 2007-025501
Mar. 14, 2007 (JP) ................................ 2007-064353

(51) Int. Cl.
*E05B 3/00* (2006.01)
*B60J 5/00* (2006.01)

(52) U.S. Cl. ................................ 292/336.3; 296/146.6

(58) Field of Classification Search ............... 292/336.3; 296/146.6

See application file for complete search history.

(56) References Cited

U.S. PATENT DOCUMENTS 4,800,638 A * 1/1989 Herringshaw et al. ....... 29/407.1
4,867,501 A * 9/1989 Nomura et al. ............ 296/146.9
5,417,470 A * 5/1995 Holt ........................ 296/187.12
5,553,910 A * 9/1996 Park ........................ 296/187.12
5,580,120 A * 12/1996 Nees et al. ................ 296/146.6
5,676,002 A * 10/1997 Hoeptner, III .................. 70/416
6,065,797 A * 5/2000 Shirasaka .................. 296/146.6
6,205,714 B1 * 3/2001 Staser et al. .................... 49/502
6,240,754 B1 * 6/2001 Petersen ......................... 70/417
6,364,398 B1 * 4/2002 Kim .......................... 296/146.6
6,406,075 B1 * 6/2002 Rice et al. .................. 292/336.3
6,523,869 B1 * 2/2003 Jensen et al. ............... 292/336.3
2003/0140477 A1 7/2003 Hughes
2007/0013206 A1 * 1/2007 Huttsell et al. ............. 296/146.6
2007/0222249 A1 * 9/2007 Valentage et al. ........... 296/39.1
2008/0276538 A1 * 11/2008 Costigan ......................... 49/375

FOREIGN PATENT DOCUMENTS

DE 195 27 888 A1 2/1997
DE 198 02 477 A1 8/1999
EP 0 162 535 A2 11/1985
GB 2 405 618 A 3/2005

(Continued)

OTHER PUBLICATIONS

Extended European Search Report dated Apr. 26, 2010; Application No. / Patent No. 08000021.9-2423 /1953020.

*Primary Examiner* — Carlos Lugo
(74) *Attorney, Agent, or Firm* — Studebaker & Brackett PC; Donald R. Studebaker

(57) ABSTRACT

A handle knob to conduct an opening/closing operation of a front door is provided on an outer-face side of an outer panel, and a handle base to pivotally support the handle knob is provided on an inner-face side of the outer panel. A beltline reinforcement to reinforce an beltline portion of the outer panel is provided on the inner-face side of the outer panel. The handle base is connected to the beltline reinforcement via an connecting portion. Thereby, the support rigidity of the handle base can be increased, thereby properly preventing the handle base from moving by an improper access.

9 Claims, 23 Drawing Sheets

FOREIGN PATENT DOCUMENTS

| | | | |
|---|---|---|---|
| JP | 04-197832 | A | 7/1992 |
| JP | 06-257335 | | 9/1994 |
| JP | H10-035285 | A | 2/1998 |
| JP | 2002-213119 | A | 7/2002 |
| JP | 2002-347440 | A | 12/2002 |
| JP | 2003-155848 | | 5/2003 |
| JP | 2004-122872 | A | 4/2004 |

* cited by examiner

DOOR STRUCTURE OF AUTOMOTIVE VEHICLE

BACKGROUND OF THE INVENTION

The present invention relates to a door structure of an automotive vehicle.

A door structure of an automotive vehicle, which comprises a handle knob provided on an outer-face side of a door outer panel to conduct an opening/closing operation of a door and a handle base provided on an inner-face side of the door outer panel to pivotally support the handle knob, is known as disclosed in Japanese Patent Laid-Open Publication No. 2003-155848.

Herein, the above-described door structure has a concern that the handle knob itself may be moved by adding an outer force to the handle knob from a vehicle outside, and thereby the handle base may be moved, so that an improper unlocking of the door could be conducted.

SUMMARY OF THE INVENTION

The present invention has been devised in view of the above-described concern, and an object of the present invention is to provide a door structure of an automotive vehicle that can prevent such an improper unlocking of the door due to an improper movement of the handle base.

According to the present invention, there is provided a door structure of an automotive vehicle, comprising a door outer panel, a handle knob provided on an outer-face side of the door outer panel to conduct an opening/closing operation of a door, a handle base provided on an inner-face side of the door outer panel to pivotally support the handle knob, and a beltline reinforcement provided on the inner-face side of the door outer panel to reinforce an beltline portion of the door outer panel, wherein the handle base is fixed to the beltline reinforcement.

According to the above-described structure, a support rigidity of the handle base can be increased by using the beltline reinforcement, so that it can be prevented to move the handle base due to an improper access.

According to an embodiment of the present invention, the door structure further comprises a door latch operationally linked to the handle knob via a transmitting member, and a cover member operative to cover the transmitting member such that the transmitting member can be hidden when viewed from an upper opening of the door, wherein the cover member includes a connecting portion to interconnect the handle base and the beltline reinforcement. Thereby, the improper access to the transmitting member can be prevented by the cover member, and by providing the connecting portion by using the cover member, the support rigidity of the handle base can be increased, reducing the number of components properly. Further, since the connecting portion interconnects the handle base and the beltline reinforcement, the support rigidity of the cover member itself increases, thereby further improving prevention of the improper access to the transmitting member.

According to another embodiment of the present invention, the cover member comprises a side wall portion that covers a vehicle-inside side portion of the transmitting member, a front wall portion that extends so as to bend outward from a front end of the vehicle-inside side portion and covers a vehicle-front side portion of the transmitting member, and an attachment piece portion that extends so as to bend forward from an outer end of the front wall portion and has a first attachment portion for the handle base and a second attachment portion for the beltline reinforcement, the attachment piece portion being connected to the front wall portion over the first and second attachment portions. Thereby, the rigidity of a cross section of the cover member between the first attachment portion for the handle base and the second attachment portion for the beltline reinforcement can be increased, so that the support rigidity of the handle base to the beltline reinforcement can be further increased.

According to another embodiment of the present invention, the beltline reinforcement is provided so as to extend in a longitudinal direction of the vehicle, a front end of which is connected to a front end portion of a door inner panel of the door, and a rear end of which is connected to a rear end portion of the door inner panel. Thereby, the attachment rigidity of the beltline reinforcement can be increased, so that the support rigidity of the handle base to the beltline reinforcement can be further increased.

According to another embodiment of the present invention, the beltline reinforcement is made of a pipe member. Thereby, since a modulus of section of the pipe member can be properly increased compared to a solid bar member, the support rigidity of the handle base to the beltline reinforcement can be properly increased.

According to another embodiment of the present invention, the door structure further comprises a door key cylinder supported at the handle base, a door latch operative to lock or unlock the door, and a key rod to connect the door key cylinder to the door latch, wherein the door key cylinder has a projection portion that projects toward an inside of the door at an inside end portion thereof, and a restriction member operative to restrict a vertical movement of the projection portion is attached to the handle base. It is preferable that the restriction member be made of a rigid member such as a metal bracket. According to the above-described structure, in a case where the door key cylinder is tried to be moved by the improper operation from the vehicle outside, the projection portion of the key cylinder contacts the restriction member and the vertical movement of the projection portion is restricted by the restriction member. Further, an outer force acting on the restriction member (by the improper operation) is received by the rigid handle base, so the improper movement of the door key cylinder can be prevented with a compact structure, thereby preventing the door latch from being unlocked improperly. Herein, since the position of the door key cylinder may not be limited by an impact bar, the door key cylinder can be located at a proper location.

According to another embodiment of the present invention, the door key cylinder is configured such that rigidity of a portion thereof that is located on a door-outer side from a key-rod connection portion thereof is smaller than rigidity of the key-rod connection portion. Thereby, since the rigidity of the portion of the door key cylinder that is located on the door-outer side from the key-rod connection portion is smaller than the rigidity of the key-rod connection portion of the door key cylinder, the portion located on the door-outer side from the key-rod connection portion can be positively broken when a relatively-large improper force acts, so that the door key cylinder and the door latch can be disconnected. Thus, the door latch can be prevented from being improperly unlocked.

According to another embodiment of the present invention, a constricted portion is formed at the portion that is located on the door-outer side from the key-rod connection portion, whereby the rigidity of the portion located on the door-outer side from the key-rod connection portion can be smaller than the rigidity of the key-rod connection portion. Thereby, the rigidity can be effectively made small with a simple structure by forming the constricted portion.

According to another embodiment of the present invention, the restriction member is attached to the handle base at least at two locations that are above and below the door key cylinder. Thereby, the support rigidity of the restriction member in the vertical direction can be increased.

According to another embodiment of the present invention, an extension portion that extends so as to be close to a back face of the door is formed integrally with a lower attachment portion of the restriction member. Thereby, since the extension portion is close to the back face of the door outer panel, this extension portion comes to contact the back face of the door outer panel when a large outer force acts, thereby properly preventing the door key cylinder from being moved. Particularly, this may be effective for the improper unlocking by an improper operation that would vertically move the handle knob itself of a door outer handle.

According to another embodiment of the present invention, a cover portion that covers above the key rod is formed integrally with a portion near an upper attachment portion of the restriction member. Thereby, the improper access to the key rod from an upper side above the key rod can be prevented.

According to another embodiment of the present invention, the restriction member includes a middle attachment portion at a middle portion thereof. Thereby, since the restriction member is attached to the handle base at its middle portion in addition to its upper and lower portions, the attachment rigidity of the restriction member to the handle base can be further increased.

Other features, aspects, and advantages of the present invention will become apparent from the following description which refers to the accompanying drawings.

BRIEF DESCRIPTION OF THE DRAWINGS

FIG. 4 is an explanatory diagram showing disposition relationships of a rear end portion of a handle knob, a handle base, a rotational member, a transmitting rod, and so on.

DETAILED DESCRIPTION OF THE INVENTION

Hereinafter, preferred embodiments of the present invention will be described referring to the accompanying drawings. It should be understood that even though embodiments are separately described, single features thereof may be combined to additional embodiments.

Embodiment 1

Figure 1:
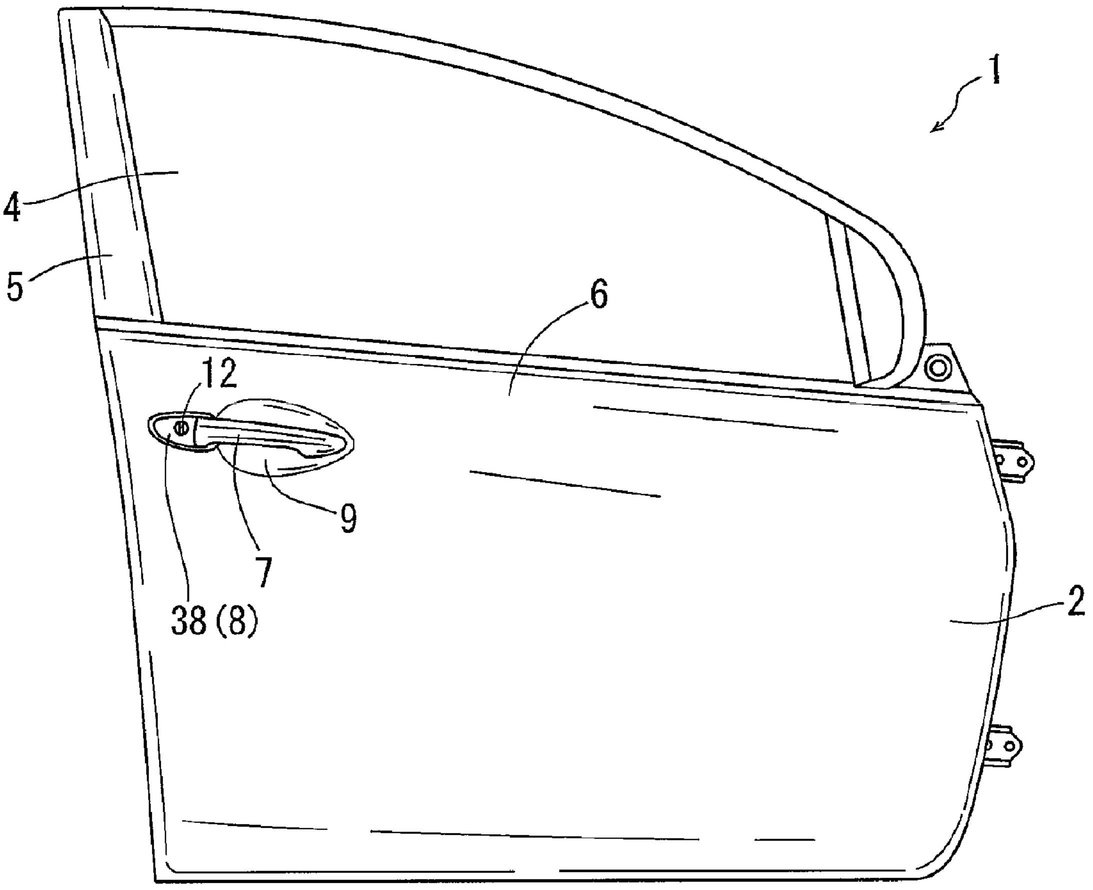
FIG. 1 is an elevation view of a front door according to a first embodiment, when viewed from an outside of the door.
Figure 2:
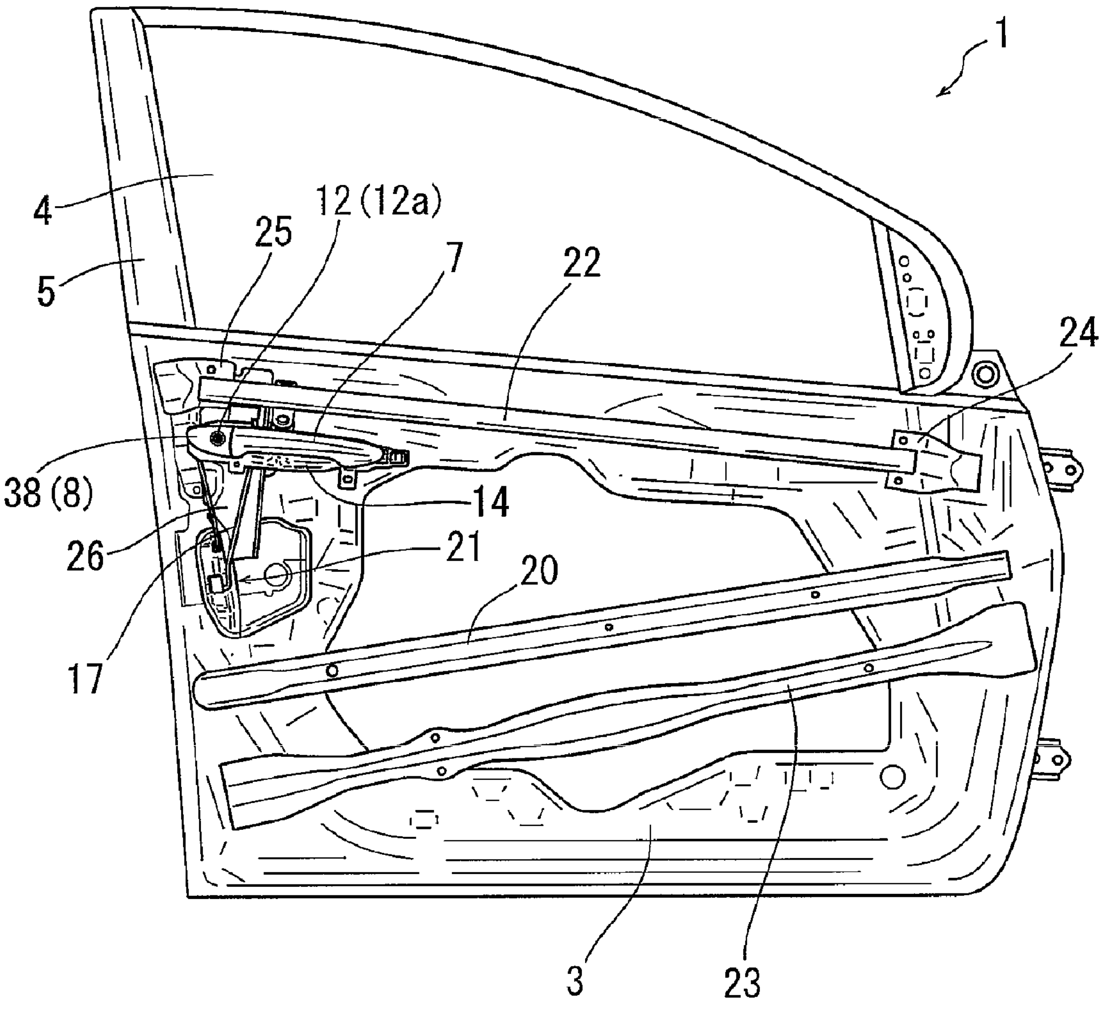
FIG. 2 is a view showing the front door of FIG. 1 in a state where an outer panel is removed.

A reference character 1 in FIGS. 1 and 2 denotes a front door with a door structure according to the present embodiment. The front door 1 comprises a door outer panel (hereinafter, referred to as "outer panel") 2 that is made of a steel plate, a door inner panel (hereinafter, referred to as "inner panel") 3 that is disposed inside and made of a steel plate, and a window sash 5 that is made of a steel plate and supports a window glass 4 provided above the panels 2, 3. FIG. 2 shows the front door in a state where the outer panel 2 is removed.

Figure 9:
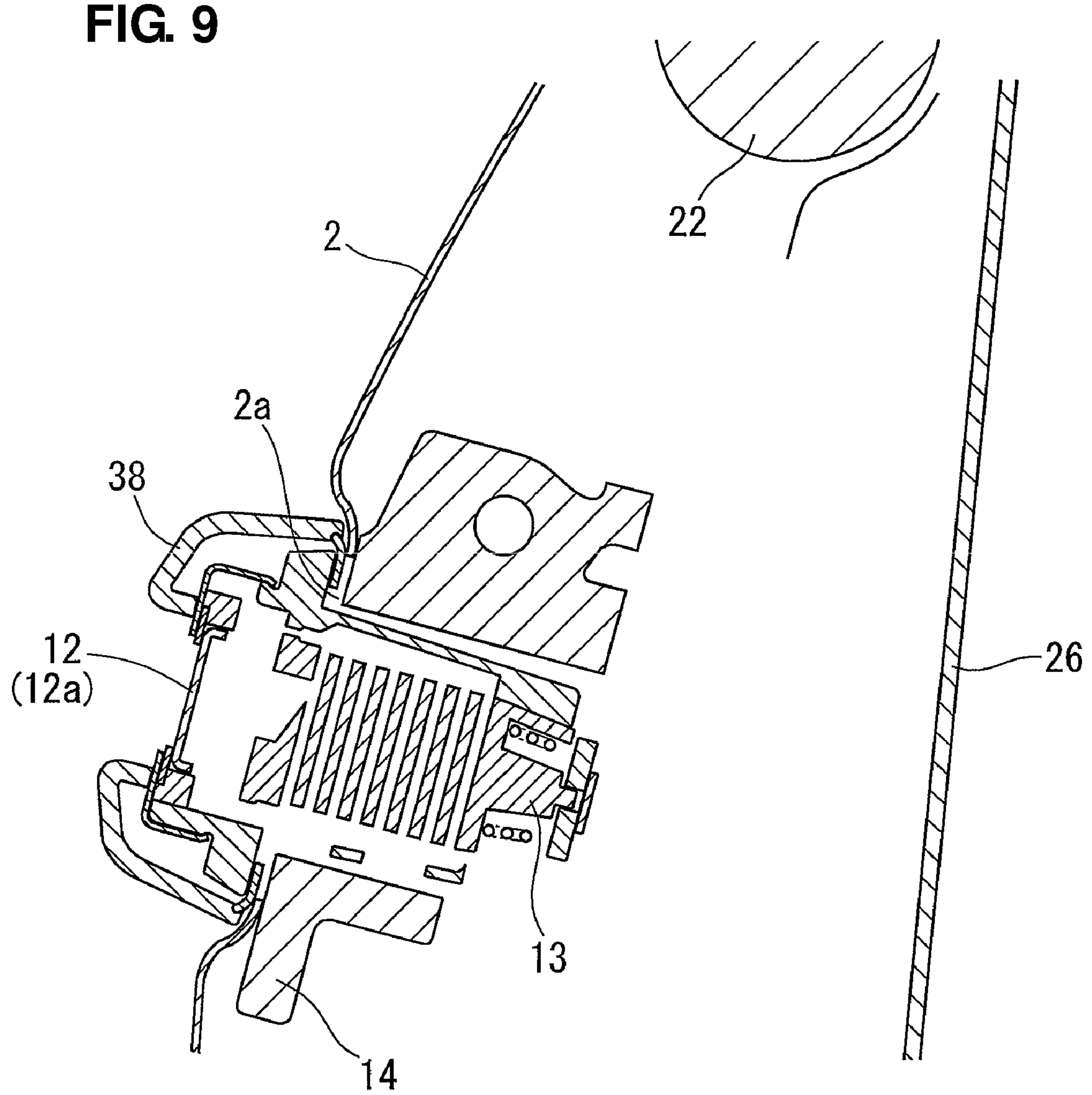
FIG. 9 is an enlarged sectional view taken along line B-B of FIG. 6.

As shown in FIGS. 1-3, 8, a handle knob 7 and a block 8 are provided on an outer-face side of the outer panel 2 at a position that is on a rear-end side (a left side in FIG. 1) of the front door 1 and below a beltline portion 6 of the outer panel 2. The handle knob 7 is disposed at the rear-end side of the front door 1 so as to extend longitudinally (in a lateral direction shown in FIGS. 1 and 2) for conducting an opening/closing of the front door 1 thereby. Behind the handle knob 7 is formed a recess portion 9 in an arch shape on the outer panel 2 for facilitating holding of the handle knob 7. A front end portion 7*a* of the handle knob 7 is provided so as to extend in such a manner that it is a little offset toward an inner-face side from other members of the handle knob 7, and it is located on an inner-face side of the outer panel 2 via an insert hole, not illustrated, on the outer panel 2. An engagement piece portion 11 having an engagement hole 10 is provided on an inner face of the rear end portion 7*b* of the handle knob 7. The engagement piece portion 11 is provided so as to be inserted into an insertion hole 2*a* that is formed at the outer panel 2 and extend toward the inner-face side of the outer panel 2 (see FIGS. 4 and 10). The block 8 is disposed just behind the handle knob 7 and covered with a cover member 38 that has an external shape continuous to the handle knob 7. Inside the block 8 is installed a key cylinder 12 for key locking/unlocking. Only an key insertion portion 12*a* of the key cylinder 12 is exposed to the outside of the cover member 38. The block 8 is also provided in such a manner that its back face portion is inserted into the insertion hole 2*a*. A rotational shaft 13 for transmitting a key operation of the key cylinder 12 is also provided on the inner-face side of the outer panel 2 (see FIGS. 5, 9 and 10).

Figure 3:
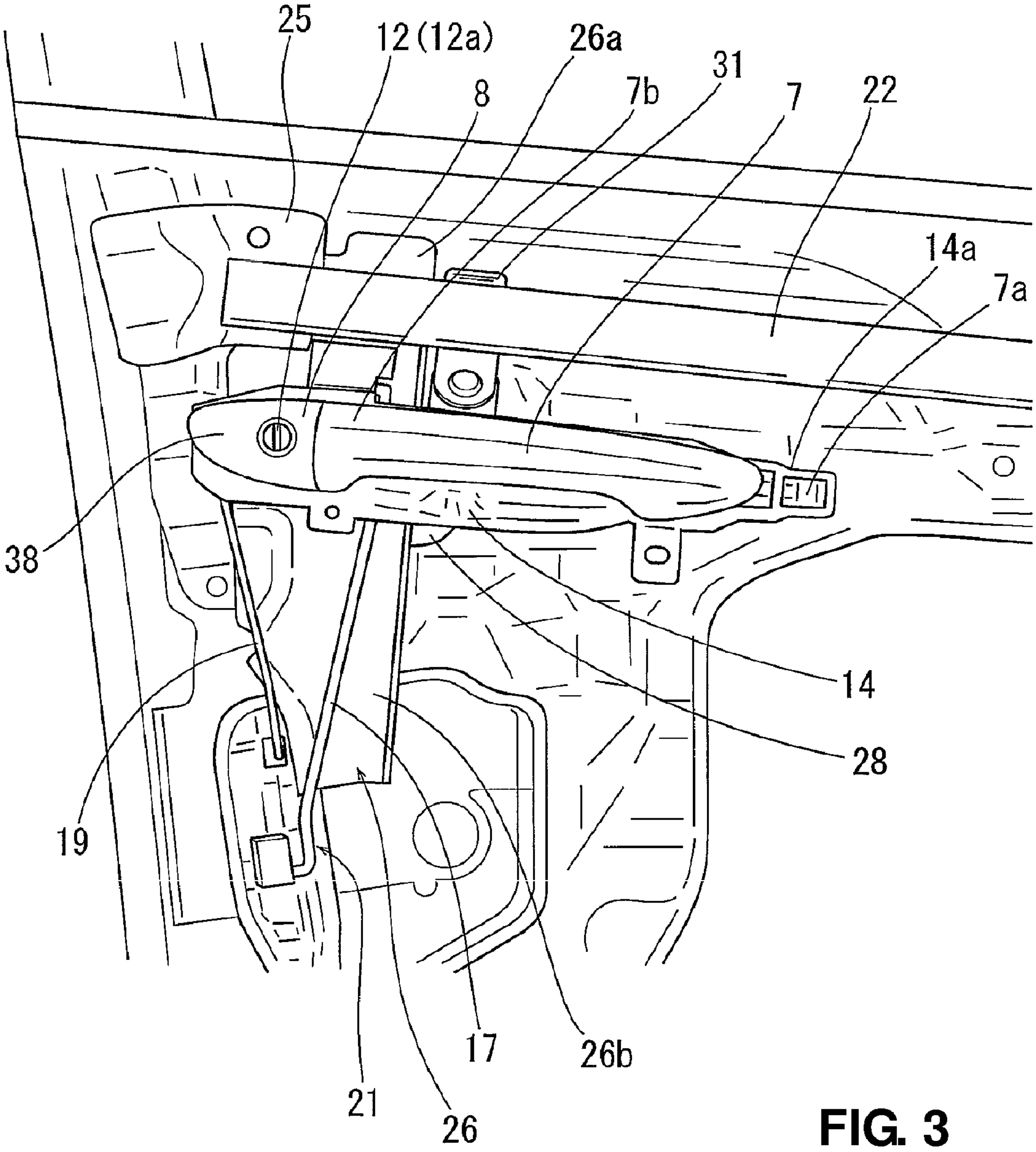
FIG. 3 is an enlarged view of part of FIG. 1.
Figure 4:
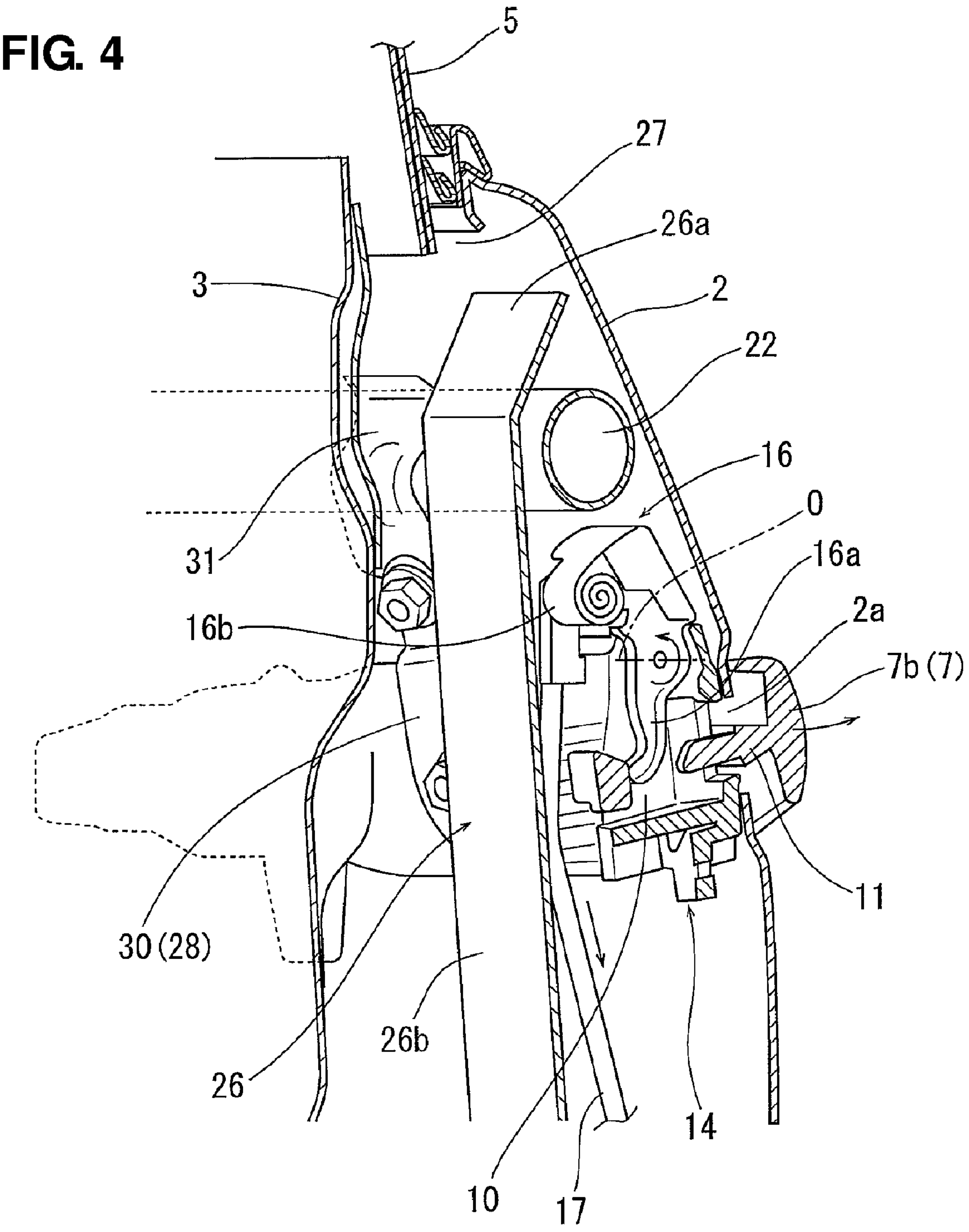
Figure 5:
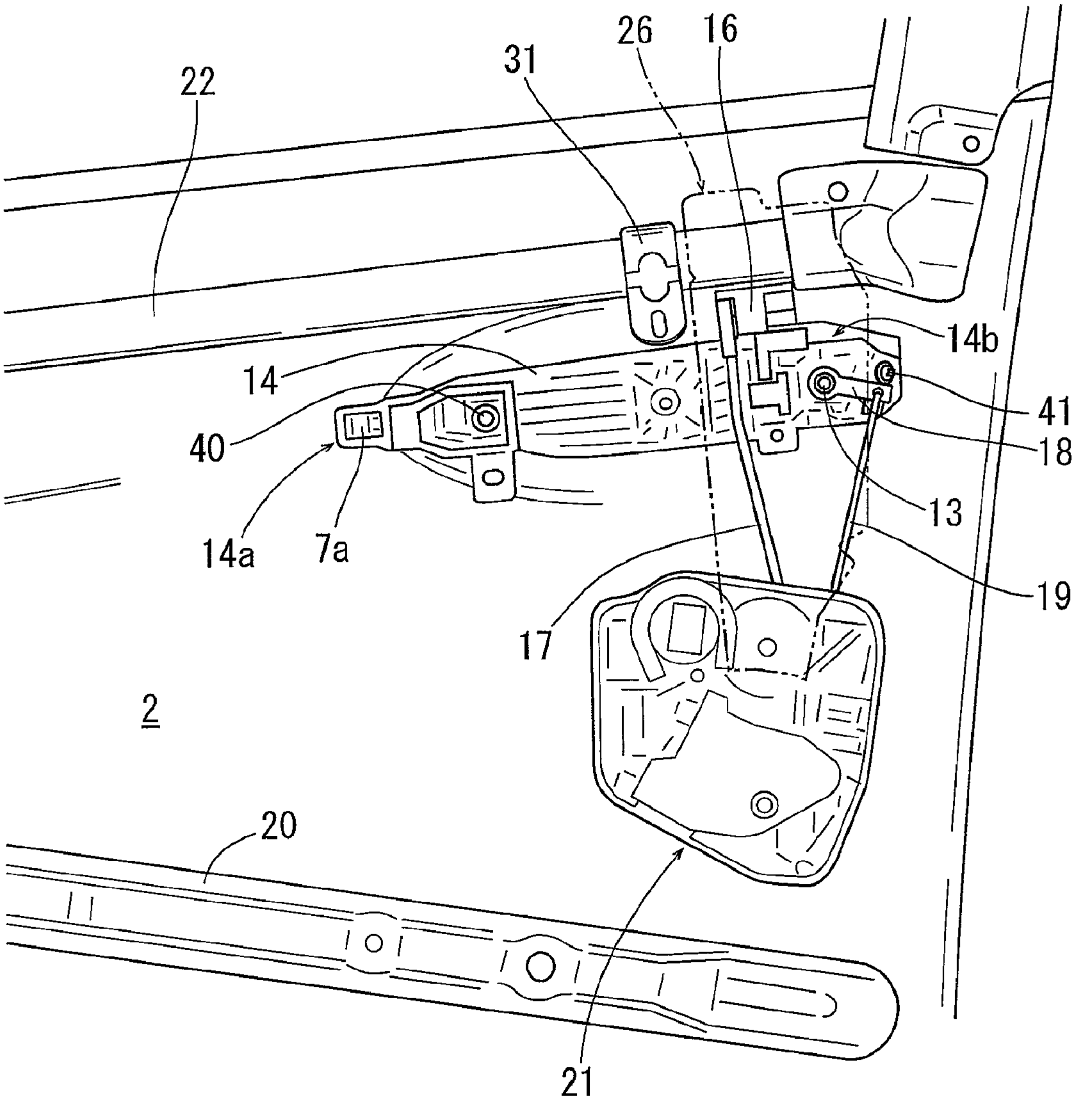
FIG. 5 is a view of the front door in a state where an inner panel is removed, when viewed from an inner-face side of the outer panel.
Figure 10:
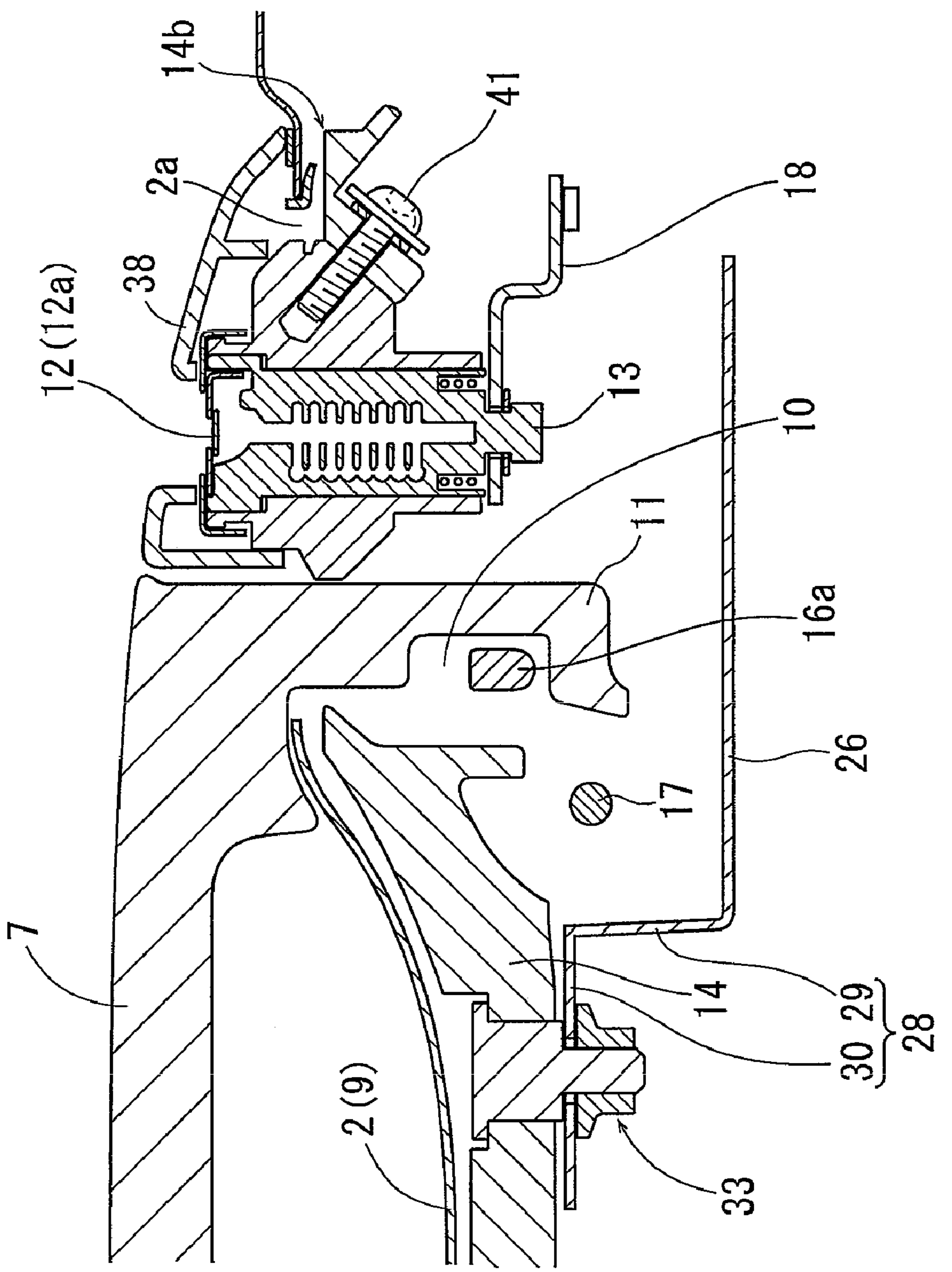
FIG. 10 is an enlarged sectional view taken along line C-C of FIG. 6.

The handle base 14 is disposed on the inner-face side of the outer panel 2 at a location corresponding to the handle knob 7 and the block 8, as shown in FIGS. 3-10. A front end portion of the handle base 14 is fixed to the inner face of the outer panel 2 with a screw stop member 37 and a screw 40 behind the handle knob 7 (see FIG. 8). A rear end portion of the handle base 14 is fixed with a screw 41 in a state where a peripheral portion of the insertion hole 2*a* of the block 8 is placed between the block 8 and the rear end portion of the handle base 14. The handle base 14 extends longitudinally along the outer panel 2. The handle base 14 has a knob support portion 14*a* at its front end portion. The knob support portion 14*a* supports (engages with) the front end portion 7*a* of the handle knob 7 so that the front end portion 7*a* can slide longitudinally and rotate horizontally. Thereby, the rear end portion 7*b* of the handle knob 7 can move away from the outer face of the outer panel 2 so as to rotate around the front end portion 7*a* as the operational movement of the knob handle 7 for opening the door. A rotational member 16 is supported at the handle base 14 so as to rotate around a longitudinally-extending rotational axis O in a rotational area of the rear end portion 7*b* of the handle knob 7, as shown in FIGS. 4 and 10. The rotational member 16 includes arm portions 16*a*, 16*b*. The arm portion 16*a* extends through the engagement hole 10 of the engagement piece portion 11, and the arm portion 16*b* is coupled to an upper end portion of the transmitting rod 17 that extends vertically. Thereby, the opening operation of the handle knob 7 is transmitted to the transmitting rod 17 via the rotational member 16 as shown by an arrow in FIG. 4. The handle base 14 has a block support portion 14*b* at its rear end portion. The above-described block 8 is fixed to the block support portion 14*b*. Herein, the rotational shaft 13 of the key cylinder 12 is provided so as to project rearward from the block support portion 14*b* of the handle base 14 (see FIG. 10). To the rotational shaft 13 is coupled an upper end portion of a transmitting rod 19 that extends vertically via a lever 18. Thereby, the key operation of the key cylinder 12 is transmitted to the transmitting rod 19. Herein, the above-described rotational member 16 and transmitting rods 17, 19 constitute transmitting members. FIG. 5 shows the front door 1 in a state where the inner panel 3 is removed, when viewed from the inner-face side of the outer panel 2.

Further, a stiffener 20 is attached to the inner face of the outer panel 2 as shown in FIGS. 2 and 5. The stiffener 20 to increase a tension rigidity of the outer panel 2 is provided so as to extend longitudinally and obliquely between the front end portion and the rear end portion of the outer panel 2.

To an inner face of the inner panel is attached a door latch mechanism 21 as shown in FIGS. 2, 3 and 5. The door latch mechanism 21 can hold the font door 1 in its closed position by making a striker (not illustrated), that is fixed to a vehicle-body pillar, engage therewith via a latch opening portion formed at the inner panel 3 when the front door 1 is closed. This latch mechanism 21 is located below the handle base 14. Respective lower end portions of the transmitting rods 17, 19 are linked to the door latch mechanism 21. Thereby, the door latch mechanism 21 allows the opening of the front door 1 with the movement of the transmitting rod 17 according to the operation of the handle knob 7, and locks or unlocks the front door 1 with the movement of the transmitting rod 19 according to the key operation of the key cylinder 12.

Further, a beltline reinforcement 22 and an impact bar 23 are attached to the inner face of the inner panel 3 as shown in FIGS. 2, 3 and 5. The beltline reinforcement 22 of the present embodiment is made of a pipe member, and provided so as to extend longitudinally along and near the beltline portion 6 at a location that is slightly above the handle base 14. Its front end portion is connected to the front end portion of the inner panel 3 via a support member 24, and its rear end portion is connected to the rear end portion of the inner panel 3 via a support member 25. The impact bar 23 is provided so as to extend in parallel to the stiffener 20 at a location that is below the stiffener 20. Its one end portion (front end portion) is connected to the front end portion of the inner panel 3, and the other end portion (rear end portion) is connected to the rear end portion of the inner panel 3.

As shown in FIGS. 3, 4, 6 and 7, a cover member 26 is provided between the outer panel 2 and the inner panel 3 on a side of the inner panel 3 from the beltline reinforcement 22, rotational member 16, transmitting rods 17, 19. An upper portion 26*a* of the cover member 26 extends above the beltline reinforcement 22 and bends toward the outer panel 2. A lower portion (side wall portion) 26*b* of the cover member 26 extends downward to the door latch mechanism 21. The upper and lower portions 26*a*, 26*b* cover the rotational member 16 and the transmitting rods 17, 19 from a side of an upper opening 27 of the front door 1 and the inner panel 3, so that these members 16, 17, 19 can be hidden when viewed from the upper opening 27. Herein, it is preferable that the cover member 26 be connected to the beltline reinforcement 22, a case of the door latch mechanism 21 or the like. A reference character 35 in FIG. 7 denotes a trim.

Figure 6:
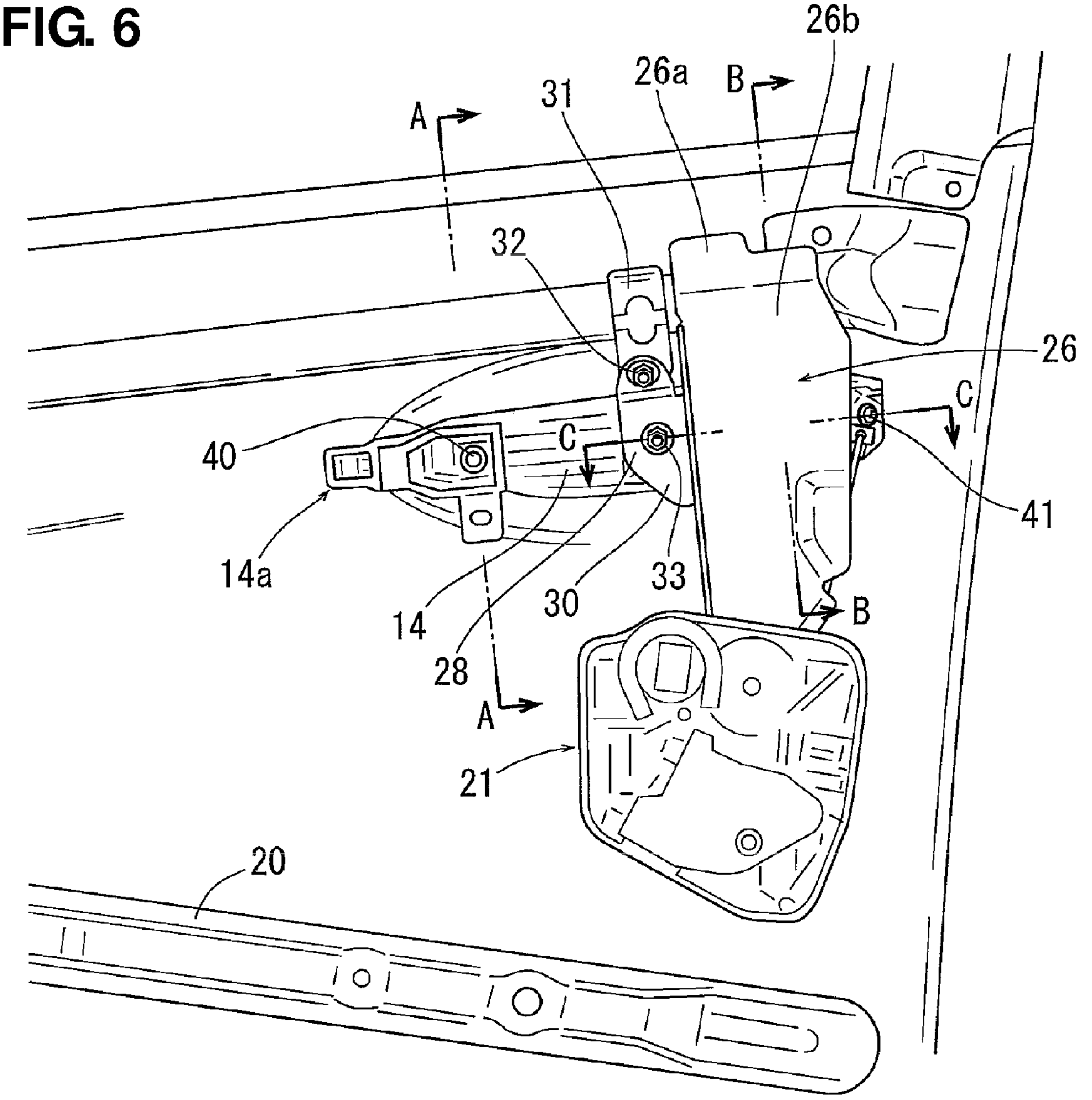
FIG. 6 is a view of the front door of FIG. 5 in a state where a cover member is attached thereto.
Figure 7:
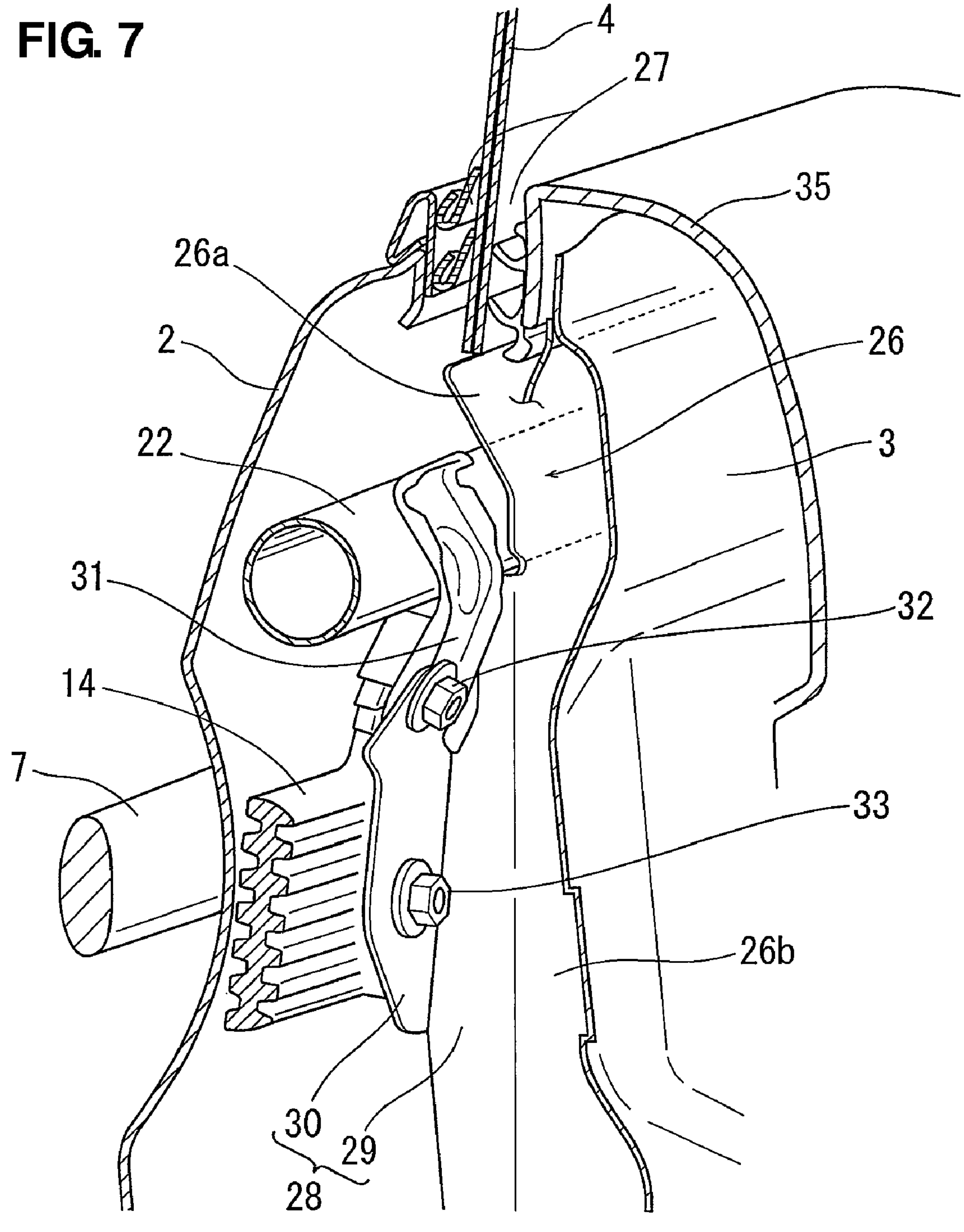
FIG. 7 is an explanatory diagram showing disposition state of a beltline reinforcement, the handle base and the cover member.
Figure 8:
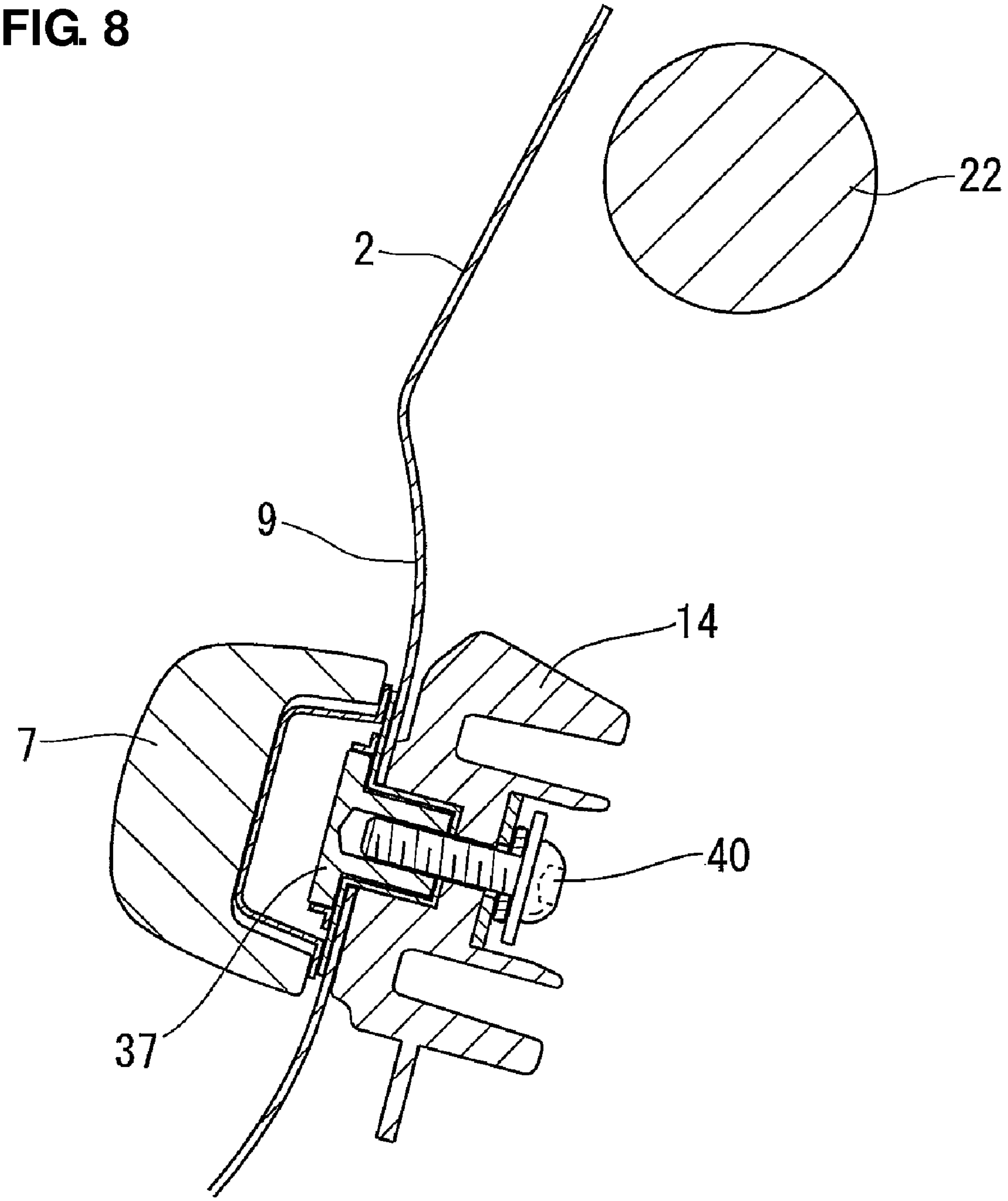
FIG. 8 is an enlarged sectional view taken along line A-A of FIG. 6.

At the lower portion 26*b* of the cover member 26 is provided a connecting portion 28 on a side of the front end of the front door 1 as shown in FIGS. 4, 6, 7 and 10. The connecting portion 28 comprises a front wall portion 29 that bends toward the outer panel 2 and an attachment piece portion 30 that extends so as to bend forward from the front wall portion 29. The attachment piece portion 30 interconnects the beltline reinforcement 22 and the handle base 14. In the present embodiment, an attachment member 31 is previously fixed to the beltline reinforcement 22 by welding or the like, and an attachment portion (attachment hole) of the attachment member 31 and the handle base 14 are interconnected by the attachment piece portion 30 from an easy-assembling standpoint (see FIGS. 5 and 6). In FIGS. 6 and 7, a reference character 32 denotes a connecting member to connect the attachment member 31 to an upper end portion (second attachment portion) of the attachment piece portion 30, and a reference character 33 denotes a connecting member to connect the handle base 14 to a lower end portion (first attachment portion) of the attachment piece portion 30. Herein, while the attachment piece portion 30 is configured to bend from the front wall portion 29 as described above, the attachment piece portion 30 is connected to the front wall portion 29 between the above-described connecting members 32, 33. Thereby, its rigidity of the cross section between the attachment portion for the handle base 14 and the attachment portion for the beltline reinforcement 22 can be increased, so that the support rigidity of the handle base 14 to the beltline reinforcement can be further increased.

According to the above-described door structure, since the cover member 26 can cover the transmitting rods 17, 19 so that the transmitting rods 17, 19 can be hidden, when viewed from the upper opening 27 of the front door 1, the improper access to the transmitting rods 17, 19 can be prevented. Further, since the beltline reinforcement 22 and the handle base 14 are interconnected by the connecting portion 28 (attachment piece portion 30), the support rigidity of the handle base 14 can be increased, so that it can be suppressed that handle base 14 is moved by adding an outer force to the handle knob 7. Thereby, an improper unlocking of the door by the improper access can be prevented.

Herein, since the beltline reinforcement 22 is provided so as to extend longitudinally in such a manner that its front end portion is connected to the front end portion of the inner panel 3 and its rear end portion is connected to the rear end portion of the inner panel 3, the support rigidity of the beltline reinforcement 22 to the inner panel 3 can be increased, so that the support rigidity of the handle base 14 connected to the beltline reinforcement 22 via the connecting portion 28 can be increased. Further, since the beltline reinforcement 22 is made of the pipe member, a modulus of section of the pipe member can be properly increased compared to a solid bar member (in general, the modulus of section a pipe member is $3/\sqrt{2}$ times as large as the modulus of section of a solid bar member in a case where the pipe member has an inner diameter that is equal to a diameter of the solid bar member and has its cross section area enclosed between its inner diameter and its outer diameter that is equal to a cross section area of the solid bar member). Thus, the support rigidity of the handle base 14 can be properly increased.

Herein, in a case where the beltline reinforcement 22 and the handle base 14 are interconnected via the attachment piece portion 30, it is preferable that the front wall portion 29 be configured to extend from the connecting member 29 to the beltline reinforcement 22 so as to be integrated with the beltline reinforcement 22. This is because the cross section of the front wall portion 29 can increase the rigidity properly against an outer force in a vertical direction and an outer force in a door-thickness direction. Thereby, the support rigidity of the handle base 14 can be further increased.

Further, according to the present embodiment, the connecting portion 28 to interconnect the beltline reinforcement 22 and the handle base 14 is provided by using the cover member 26, so the support rigidity of the handle base 14 can be increased, reducing the number of components properly. Further, since the connecting portion 28 interconnects the handle base 14 and the beltline reinforcement 22, the support rigidity of the cover member 26 itself increases, thereby further improving prevention of the improper access (improper key unlocking) to the transmitting members 17, 19 and the like. Herein, the handle base 14 and the beltline reinforcement 22 may be interconnected by another independent member than the cover member 26.

Embodiment 2

Figure 11:
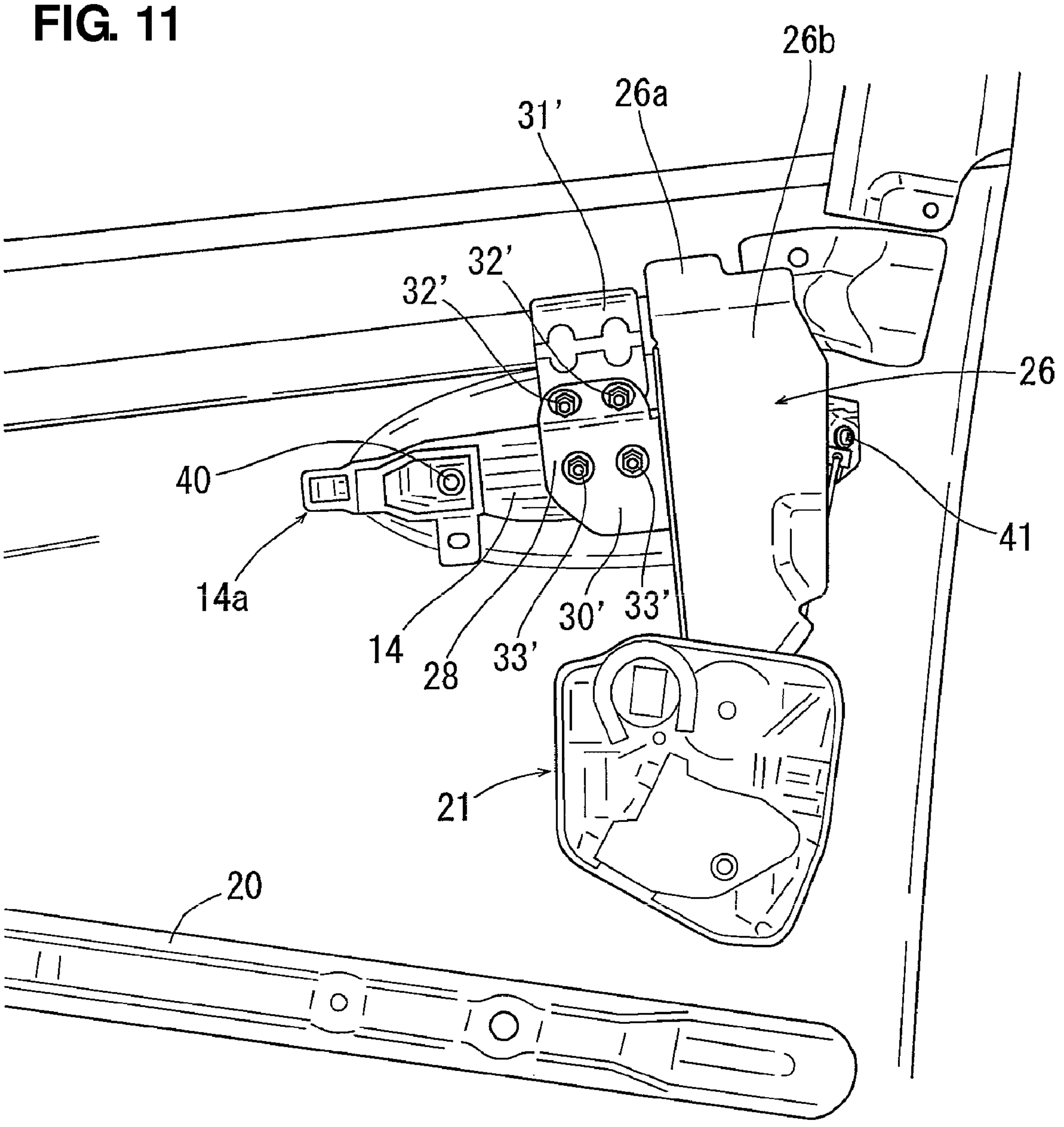
FIG. 11 is an explanatory diagram of a second embodiment.

FIG. 11 shows a second embodiment. In the second embodiment, an attachment piece portion 30' and an attachment member 31' are configured to expand further widely in a lateral direction (vehicle-body longitudinal direction) than those of the first embodiment. Further, an upper end portion (second attachment portion) of the attachment piece portion 30' and a lower end portion of the attachment member 31' are connected via two connecting members 32', and a lower end portion (first attachment portion) of the attachment piece portion 30' and the handle base 14 are connected via two connecting members 33'. Thereby, the increase of the support rigidity of the handle base 14 can be further improved by the attachment piece portion 30' expanding widely. Herein, the beltline reinforcement 22 and the handle base 14 may be directly interconnected via the attachment piece portion 30' (including the front wall portion 29') without the attachment member 31' as well.

Embodiment 3

Figure 12:
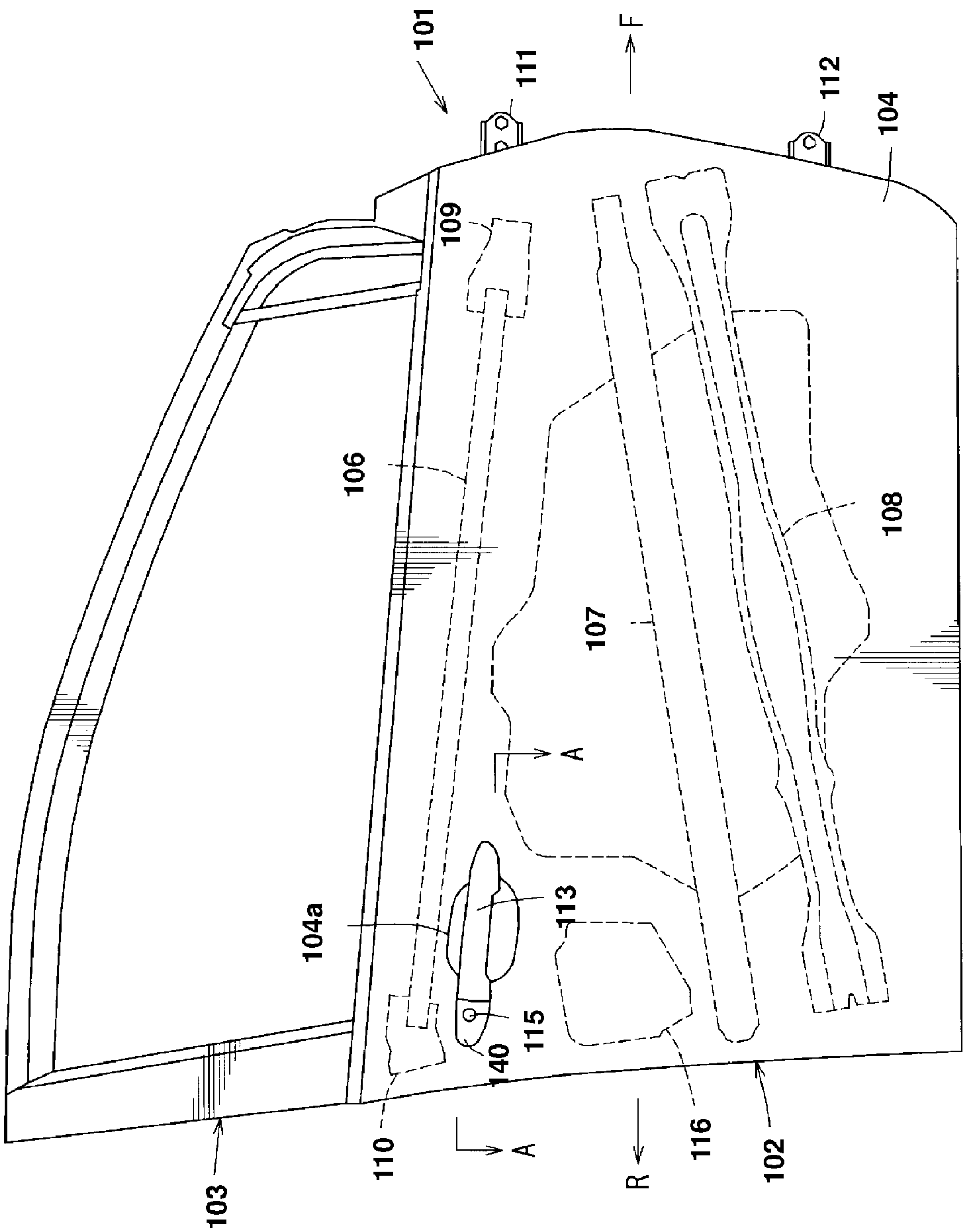
FIG. 12 is an exterior side view of a door equipped with a door key cylinder according to a third embodiment.

FIG. 12 is an exterior side view showing a door structure of an automotive vehicle, in which a door 101 comprises a door body portion 102 and a door sash portion 103.

Figure 13:
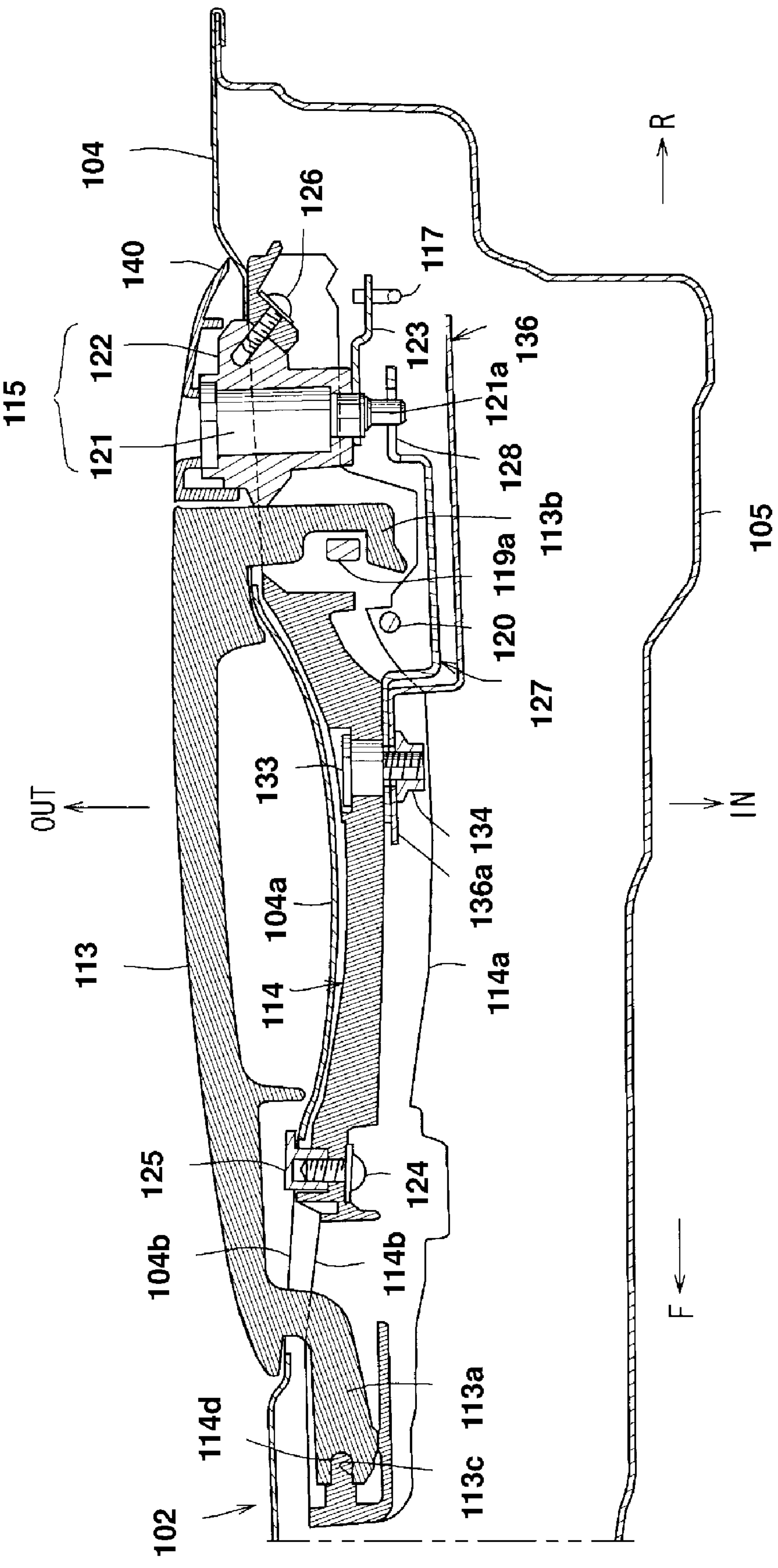
FIG. 13 is a sectional view taken along line A-A of FIG. 12.

The door body 102 is, as shown in FIG. 13 (FIG. 13 is a sectional view taken along line A-A of FIG. 12), comprises a door outer panel 104 and a door inner panel 105 which are joined as a door panel. Within the door (specifically, in the door body portion 102) are provided a beltline reinforcement 106 and impact bars 107, 108 that extend in a longitudinal direction of the vehicle as shown in FIG. 12.

The beltline reinforcement 106, which is a reinforcement that extends longitudinally along the beltline in the door 101 as shown in FIG. 12, is made of a rigid pipe member and attached to the door inner panel 105 via brackets 109, 110.

The upper-side impact bar 107 is a member for mainly ensuring the tension rigidity of the door outer panel 104, and the lower-side impact bar 108 is a member for mainly preventing the door body portion 102 from being pushed into a vehicle compartment at a vehicle side crash.

The door 101 is supported so as to open and close by a hinge pillar (not illustrated) as a vehicle body so as to open and close via a pair of hinge brackets 111, 112 at its front portion. On an vehicle outer side of the door outer panel 104 are provided a handle knob 113 of a door outer handle as shown in FIGS. 12 and 13. Further, a recess portion 104*a* (which dents toward the vehicle inside) is formed on the door outer panel 104, corresponding to the handle knob 113.

A door structure around a key cylinder of the automotive vehicle in the present embodiment comprises the above-described handle knob 113 provided on the vehicle outer side of the door outer panel 104, a handle base 114 that is made of resin and provided in the door 101 to pivotally support the handle knob 113, a door key cylinder 115 that is supported at the handle base 114 (hereinafter, referred to as "key cylinder", simply), a door latch 116 that locks or unlocks the door 101 (see FIGS. 12 and 16), and a key rod 117 that interconnects the key cylinder 105 and the door latch 116 in the vertical direction.

Figure 14:
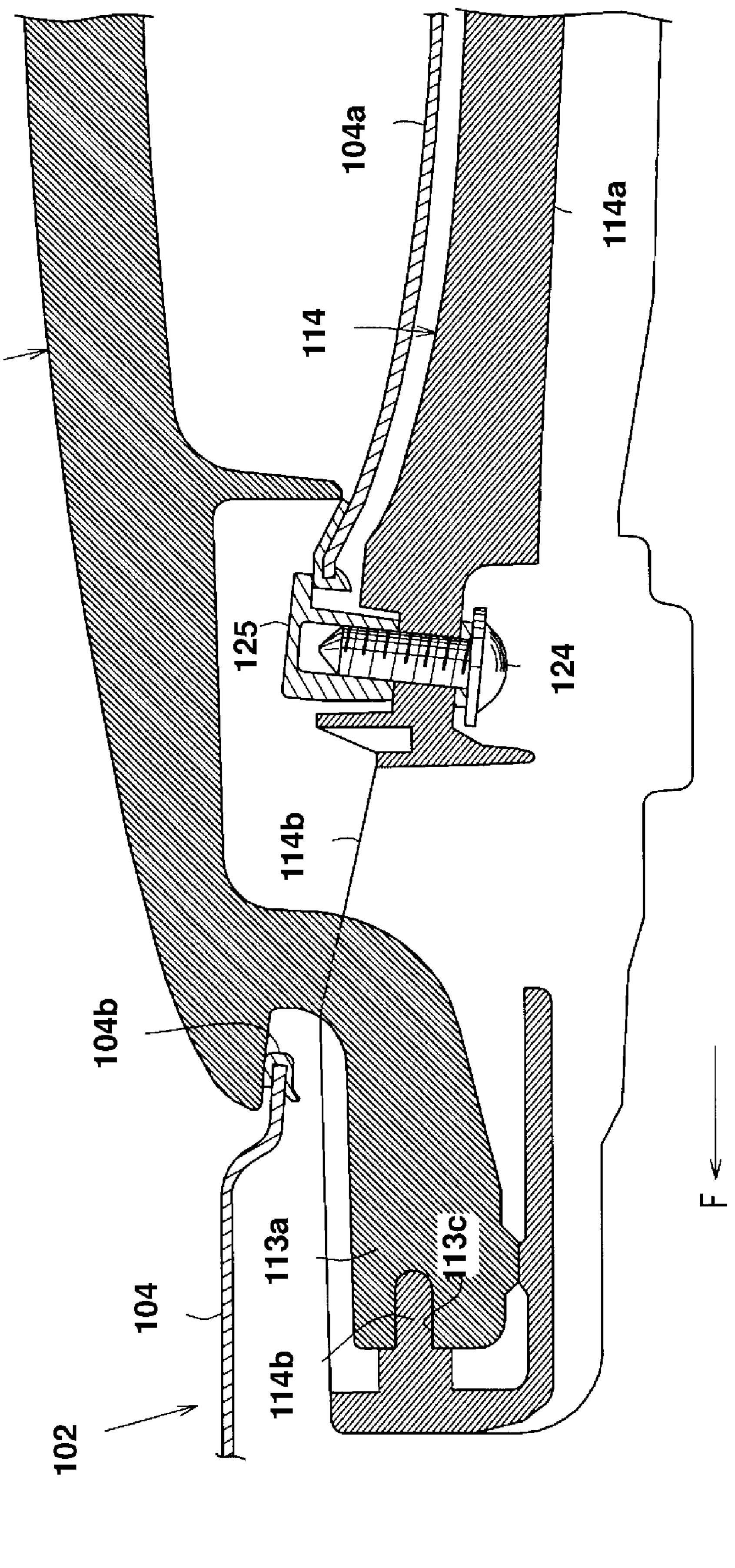
FIG. 14 is an enlarged plan view of a front part of FIG. 13.
Figure 15:
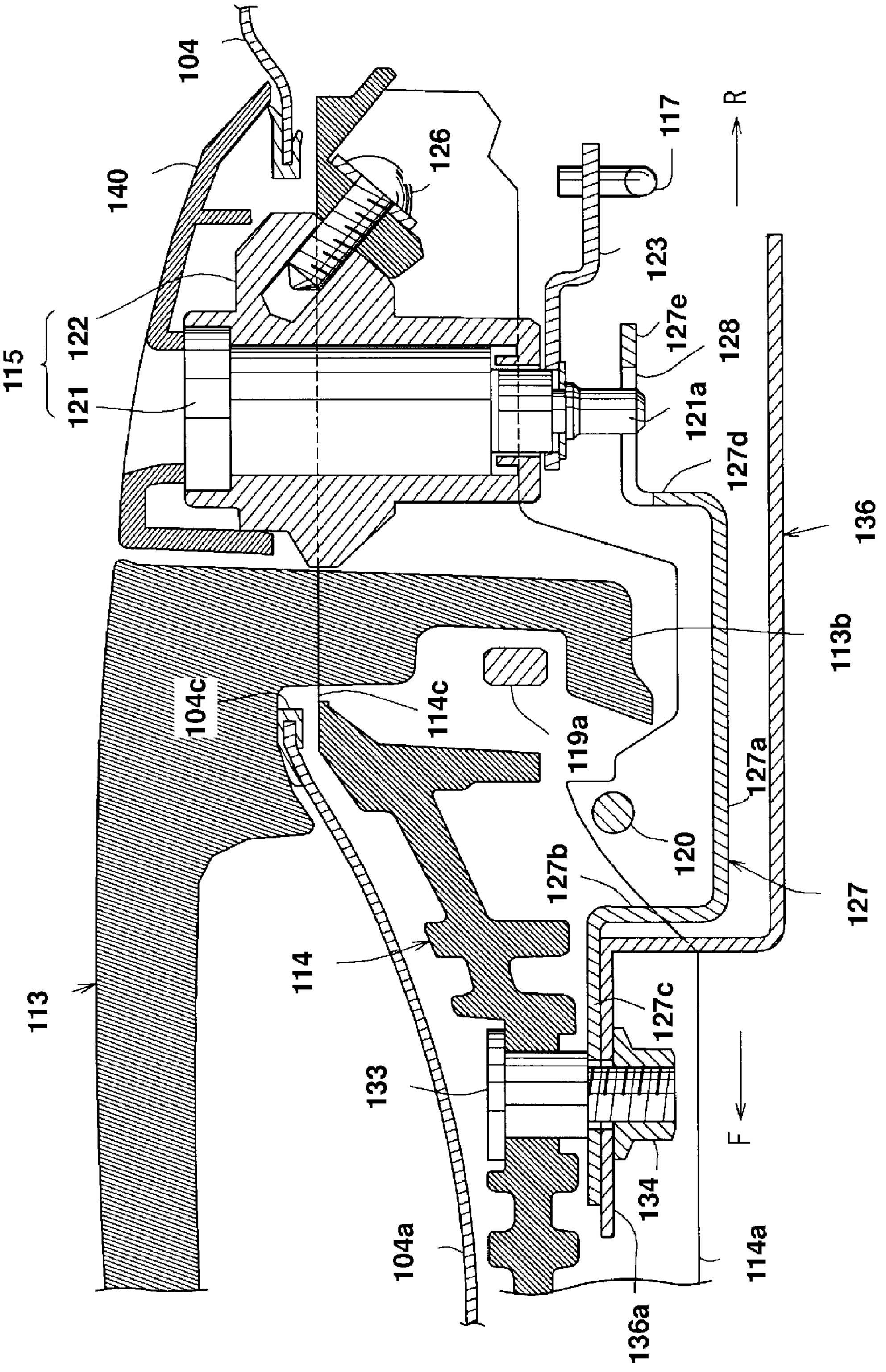
FIG. 15 is an enlarged plan view of a rear part of FIG. 13.

FIG. 14 is an enlarged plan view of a front part of FIG. 13. FIG. 15 is an enlarged plan view of a rear part of FIG. 13. As shown in FIGS. 13-15, the door outer panel 104 has an opening portion 104*b* for an arm portion 113*a* (see FIG. 14) of the handle knob 113 that is inserted into the door 101 therethrough and an opening portion 104*c* for a projection portion 113*b* (see FIG. 15) of the handle knob 113 that is inserted into the door 101 therethrough. Likewise, the handle base 114 has opening portions 114*b*, 114*c*, which correspond to the respective opening portions 104*b*, 104*c*.

At a front end portion of the arm portion 113*a* of the handle knob 113 is formed a concave groove 113*c* as shown in FIG. 14. Meanwhile, at the handle base 114 is integrally formed a convex pivotal portion 114*d* so as to correspond the above-described recess groove 113*c*. The handle knob 113 is pivotally supported by these pivotal portion 114*d* and groove 113*c* so that the handle knob 113 can be operated (pulled).

Figure 19:
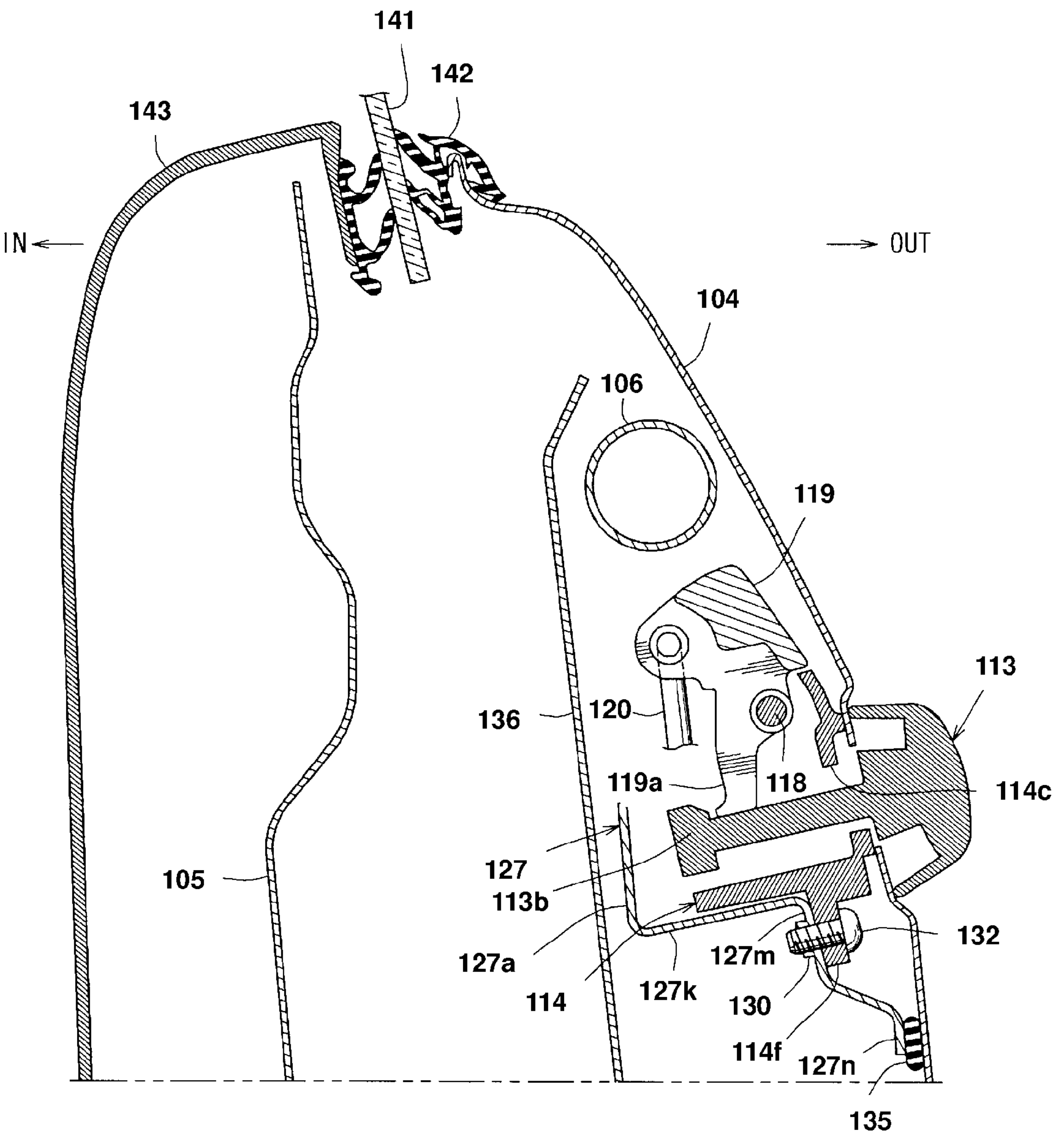
FIG. 19 is a sectional view taken along line B-B of FIG. 16.

When the handle knob 113 is pulled, a leg portion 119*a* of a rotational link 119 is operated toward a vehicle outside with a support point of a rotational center 118 shown in FIG. 19, so the rotational link 119 is rotated in an unlock direction. Thereby, an outer handle rod 120 that is attached to the rotational link 119 is lowered, so that the door latch 116 can be unlocked.

Figure 16:
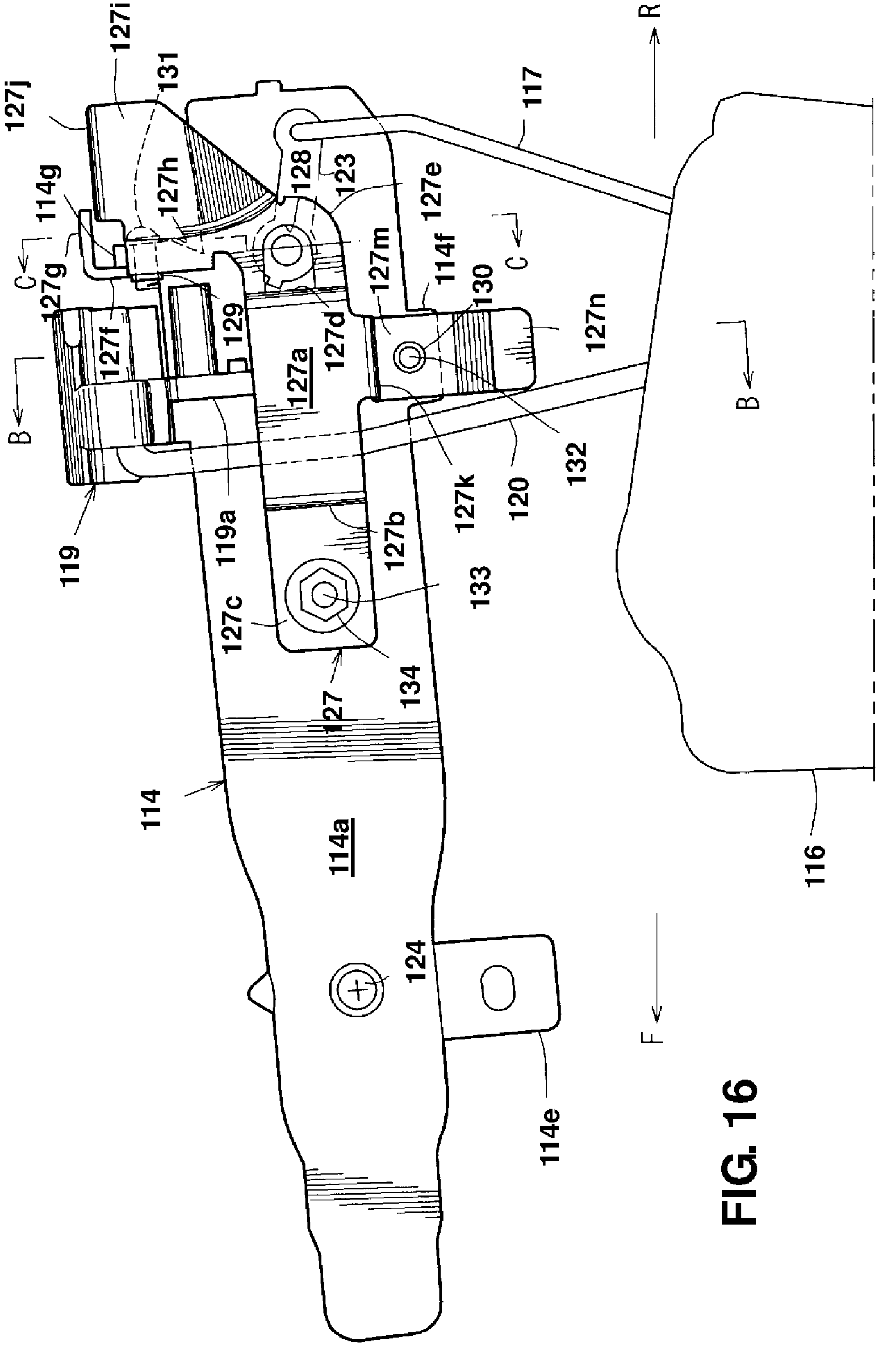
FIG. 16 is a side view of a door structure around the door key cylinder, when viewed from the door inside.
Figure 17:
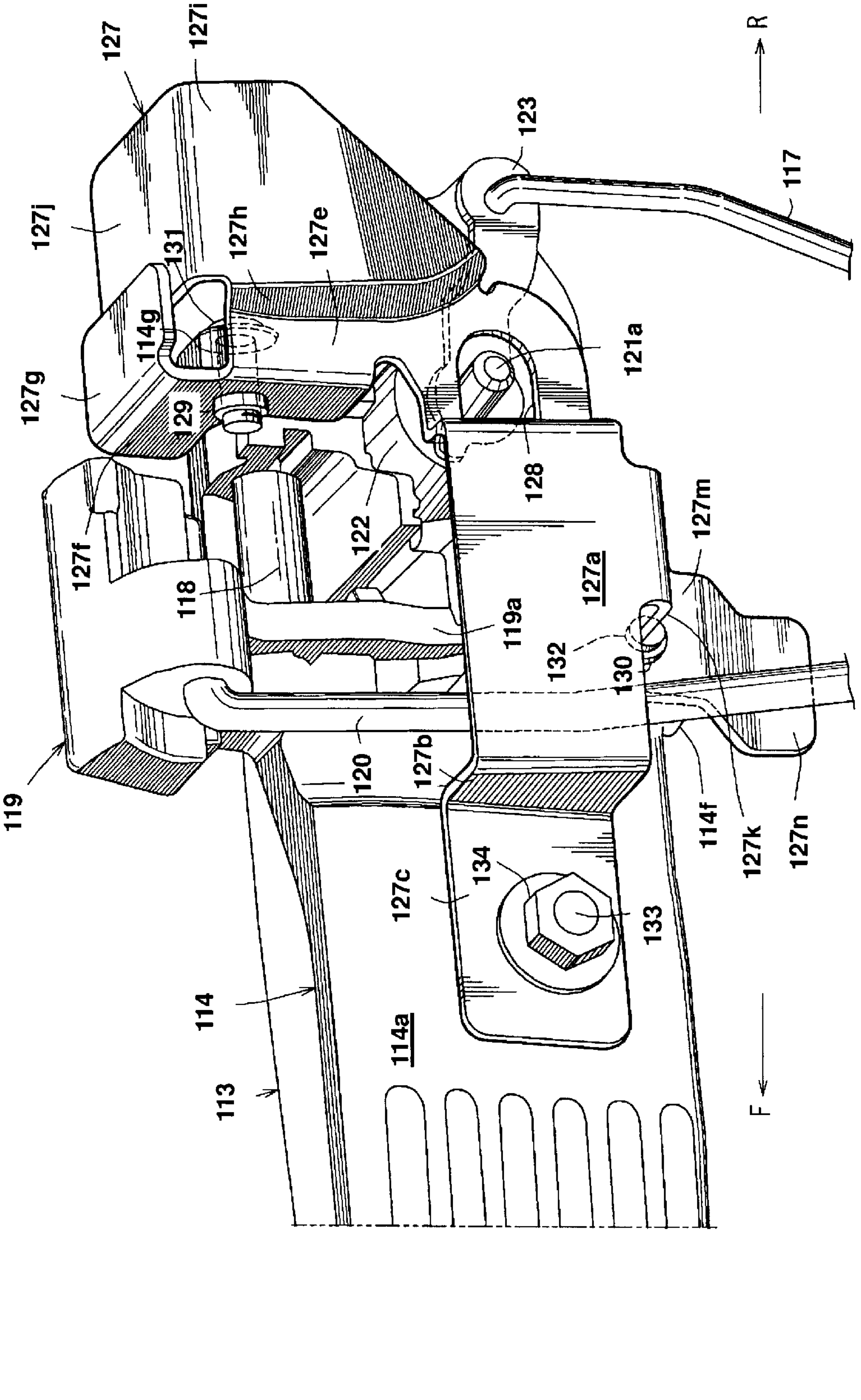
FIG. 17 is a perspective view of a major portion of FIG. 16.
Figure 18:
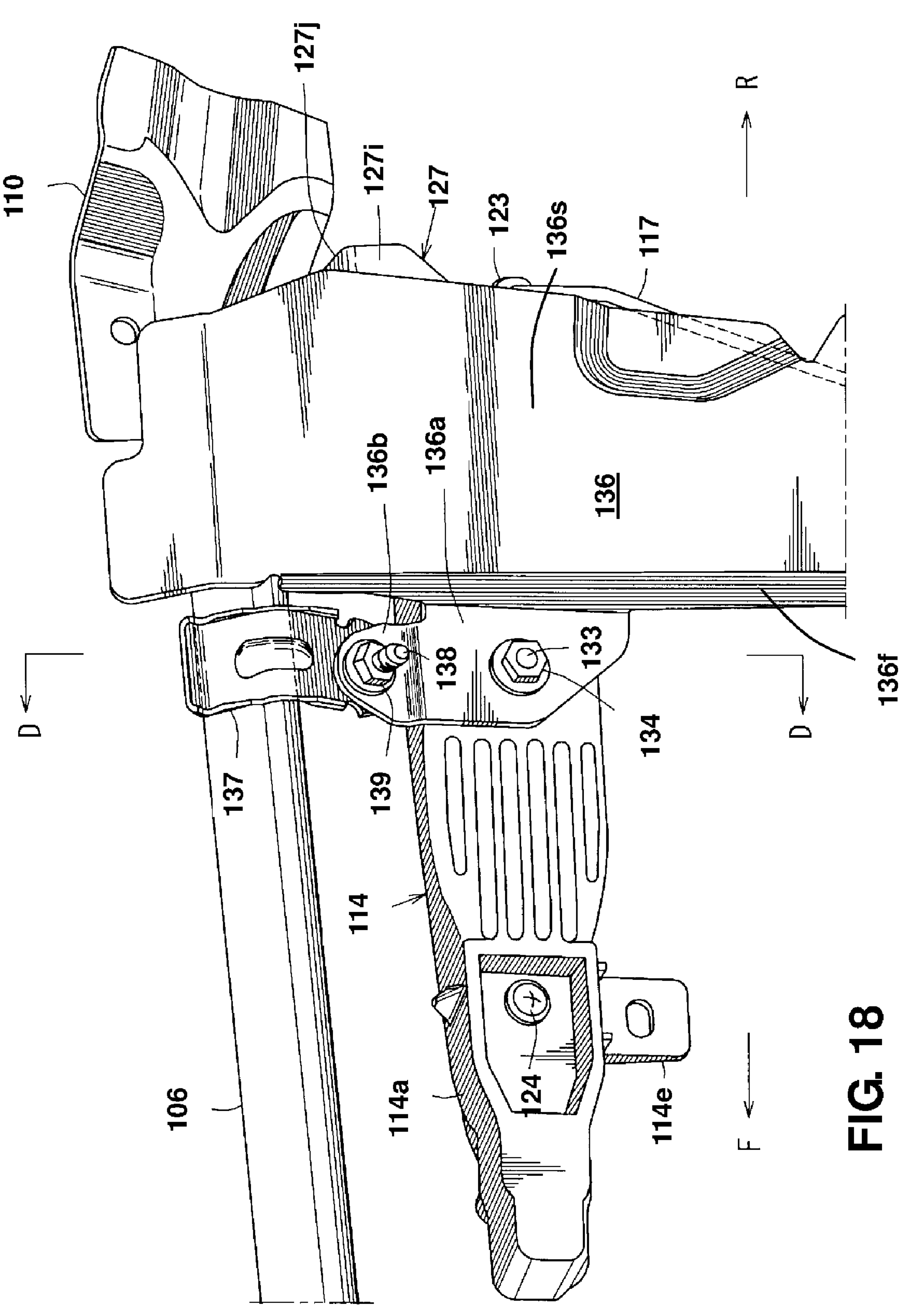
FIG. 18 is a perspective view showing a state where a protector is attached.
Figure 20:
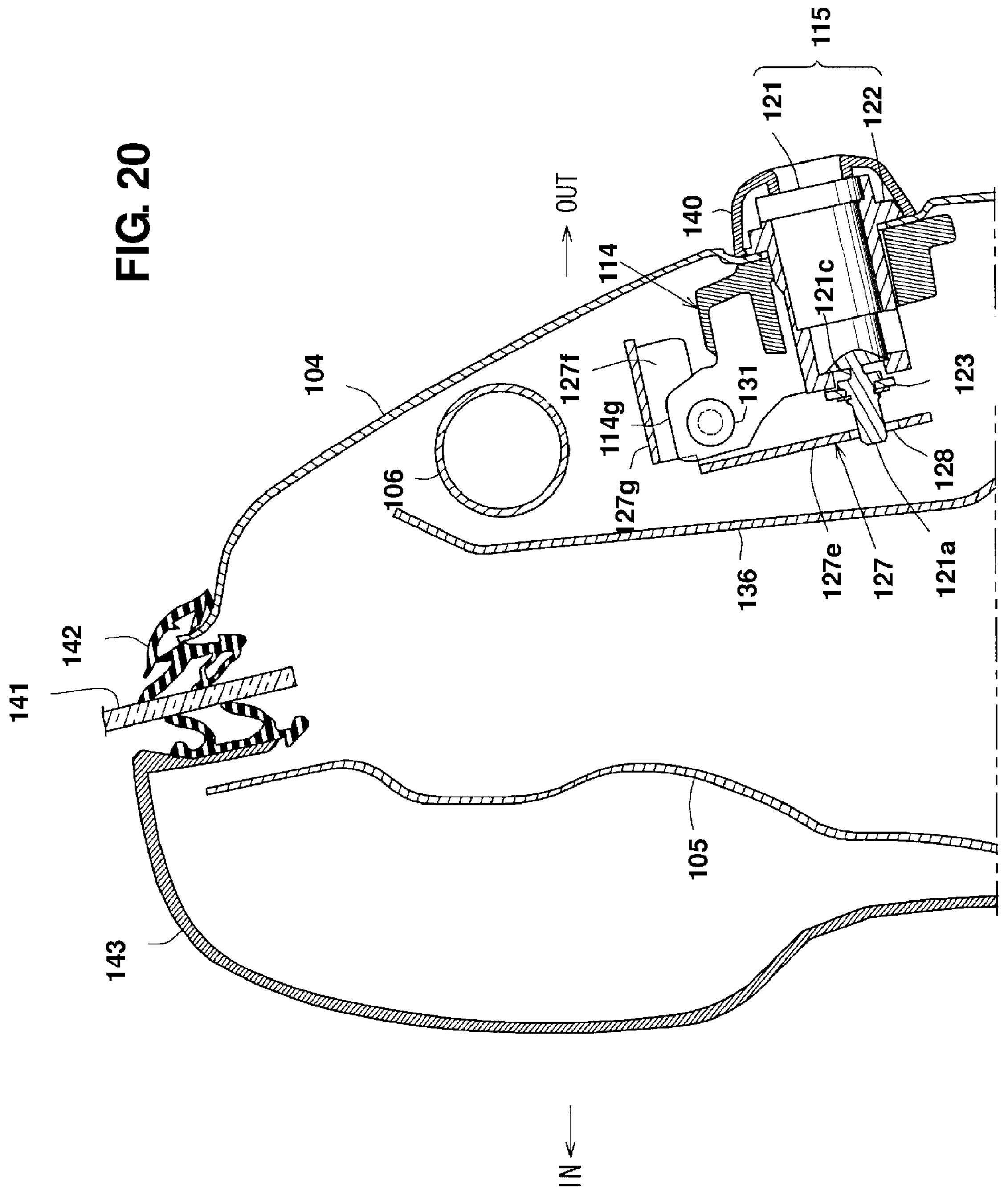
FIG. 20 is a sectional view taken along line C-C of FIG. 16.
Figure 21:
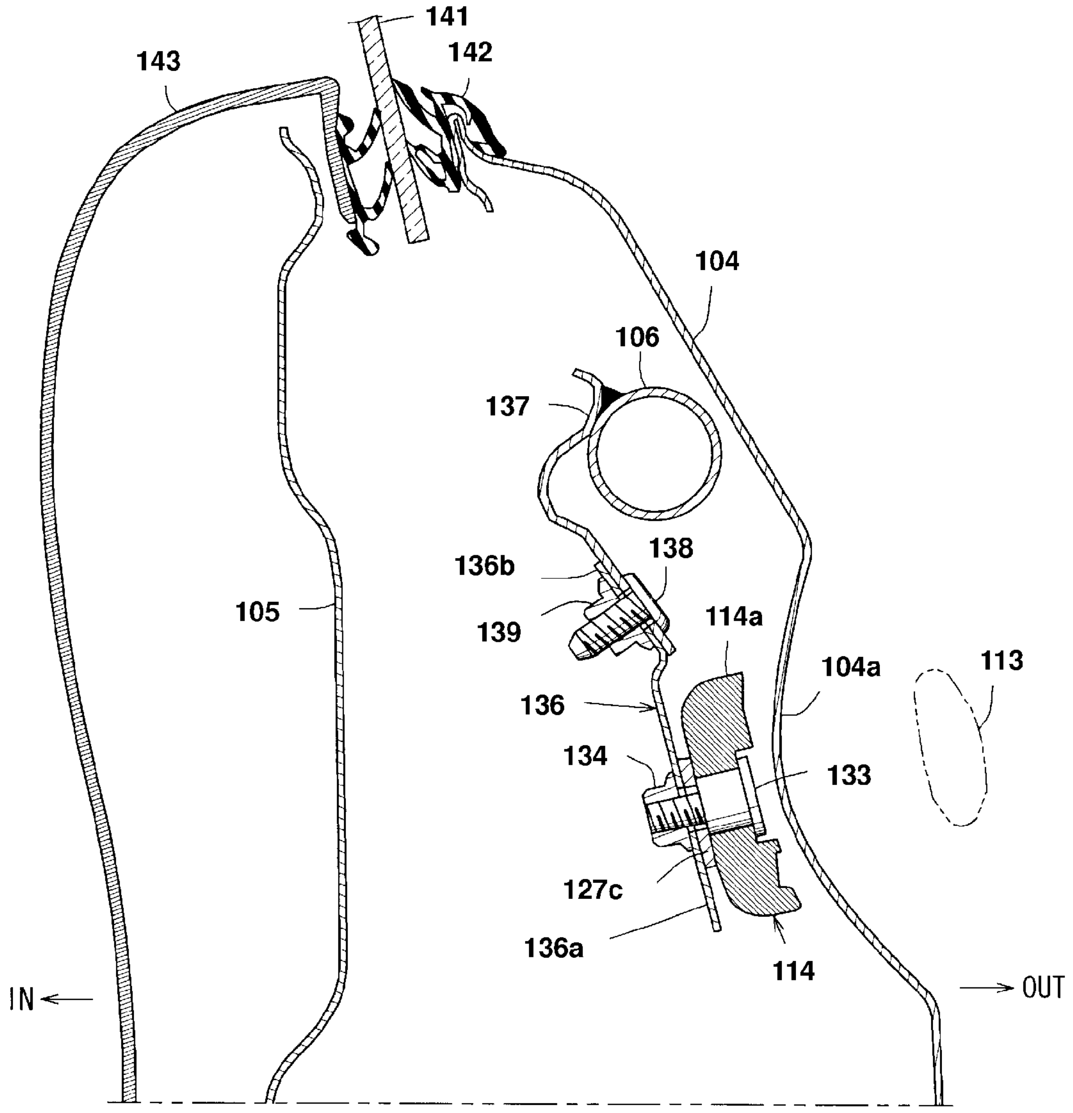
FIG. 21 is a sectional view taken along line D-D of FIG. 18.

FIG. 16 is a side view of the door structure around the door key cylinder, when viewed from the door inside, in which a protector is removed. FIG. 17 is a perspective view of a major portion of FIG. 16 (herein, the door outer panel 104 is not illustrated). FIG. 18 is a perspective view showing a state where the protector is attached. FIG. 19 is a sectional view taken along line B-B of FIG. 16. FIG. 20 is a sectional view taken along line C-C of FIG. 16. FIG. 21 is a sectional view taken along line D-D of FIG. 18.

As shown in FIGS. 15 and 20, the key cylinder 115 comprises a cylinder portion 121 that is operated (rotated) with a key (not illustrated) and an unrotable key cylinder body 122. A base end of the link 123 is engaged with an inside portion of the cylinder portion 121, and the above-described key rod 117 is coupled to an end of the link 123.

The cylinder portion 121 has a projection portion 121*a* that projects toward the inside of the door 101 at its inside end as shown in FIGS. 15 and 20.

As shown in FIG. 14, the handle base 114 is fixed at its front portion with a screw 124 and a nut member 125, by putting the door outer panel 104 between this base 114 and the members 124, 125.

As shown in FIGS. 11 and 20, the handle base 114 is fixed at its rear portion with fastening members of a screw 126 at the key cylinder body 122 and the like, by putting the door outer panel 104 between this base 114 and the member 122. Thus, the handle base 114 is fixed to the inside of the door outer panel 104 with the screws 124, 126.

The handle base 114 comprises a main piece portion 114*a* that extends longitudinally and includes the above-described opining portions 114*b*, 114*c* and pivotal portion 114*d* (see FIGS. 14 and 15), a tongue piece 114*e* (see FIG. 16) that extends downward from the main piece portion 114*a* so as to correspond to the screw 124, an attachment piece 114*f* (see FIGS. 16 and 17) that extends downward from the main piece portion 114*a* so as to correspond to the projection portion 113*b* (see FIG. 15) of the handle knob 113, an attachment piece 114*g* (see FIGS. 16, 17 and 20) that is integrally formed with the main piece portion 114*a* so as to correspond to the upper portion of the key cylinder body 122 of the key cylinder 115.

To the above-described handle base 114 is attached a bracket 127 as a restriction member that restricts a vertical movement, which is shown by an arrow M in FIG. 17, of the projection portion 121*a* of the key cylinder 115 as shown in FIGS. 16 and 17.

The bracket 127 comprises, as shown in FIG. 17, an inner piece portion 127*a*, a front piece portion 127*b*, a middle attachment portion 127*c*, a rear piece portion 127*d*, a restriction portion 127*e*, an upper attachment portion 127*f*, a cover portion 127*g*, a vertical wall portion 127*i*, a cover portion 127*j*, a lower piece portion 127*k*, a lower attachment portion 127*m*, and an extension portion 127*n*. The inner piece portion 127*a* is located inside of the outer handle rod 120. The front piece portion 127*b* extends so as to bend outward from a front end of the inner piece portion 127*a* and is located in front of the outer handle rod 120. The middle attachment portion 127*c* extends so as to bend forward from an outer end of the front piece portion 127*b*. The rear piece portion 127*d* (see FIG. 15) extends so as to bend outward from a rear end of the inner piece portion 127*a* and is located behind the outer handle rod 120. The restriction portion 127*e* extends so as to bend rearward from an outer end of the rear piece portion 127*d*. The upper attachment portion 127*f* extends so as to bend outward from an upper front end of the restriction portion 127*e*. The cover portion 127*g* extends so as to bend rearward from an upper end of the upper attachment portion 127*f* and covers over the key rod 117. The vertical wall portion 127*i* extends so as to bend rearward from a rear end of the restriction portion 127*e* via a bend wall portion 127*h*. The cover portion 127*j* extends so as to bend outward from an upper end of the vertical wall portion 127*i* and covers over the key rod 117. The lower piece portion 127*k* extends so as to bend outward from a lower end of the inner piece portion 127*a* without interfering with the outer handle rod 120. The lower attachment portion 127*m* extends so as to bend downward from an outer end of the lower piece portion 127*k*. The extension portion 127*n* extends downward from the lower attachment portion 127*m* so as to be close to a back face of the door outer panel 104.

As shown in FIGS. 15, 17 and 20, the restriction portion 127*e* of the bracket 127 has an opening portion 128 through which an inner end of the projection portion 121*a* of the key cylinder 115 extends. The projection portion 121*a* is enclosed with an edge of the opening portion 128. Thus, the vertical movement of the projection portion 121*a* is restricted by the edge of the opening portion 128, i.e., the restriction portion 127*e* (herein, a lateral movement of the projection portion 121 is restricted in addition to its vertical movement according to the present embodiment).

The upper attachment portion 127*f* and lower attachment portion 127*m* have, as shown in FIG. 17, screw portions 129, 130 respectively, which are made by screwing process. The upper attachment portion 127*f* is fixed to the attachment piece 114*g* of the handle base 114 with a screw 131 (or bolt) fastened to the screw portion 129 as shown in FIGS. 16 and 17. The lower attachment portion 127*m* is fixed to the attachment piece 114*f* of the handle base 114 with a screw 132 (or bolt) fastened to the screw portion 130 as shown in FIGS. 17 and 19.

Thus, the bracket 127 as the restriction member is attached to the handle base 114 at two locations (see the fastening portions by the screws 131, 132) that are above and below the key cylinder 115.

Further, the middle attachment portion 127*c* between the upper and lower attachment portions 127*f*, 127*m* of the bracket 127 is fixed to the main piece portion 114*a* of the handle base 114 with fastening members of a bolt 133 and a nut 134 as shown in FIGS. 16, 17 and 21.

As shown in FIG. 19, a resilient member 135 is provided between the door outer panel 104 and the extension portion 127*n* extending from the lower attachment portion 127*m* to the location close to the back face (door inside face) of the door outer panel 104.

Herein, as shown in FIGS. 15 and 18, there is provided a protector 136 as a cover member that covers inner and front sides of the outer handle rod 120 and inner and upper sides of the key cylinder 115 at an inner side of the above-described bracket 127.

Herein, this protector 136 performs substantially the same functions and effects as the cover member 26 of the previous embodiments. Namely, the protector 136 comprises a side wall portion 136*s* that covers the vehicle-inside side portion of the rods 117, 120, and a front wall portion 136*f* that covers the vehicle-front side portion of the rods 117, 120, and an attachment piece 136*a* at its front end (see FIG. 18). The attachment piece 136*a* is fixed to the middle attachment portion 127*c* of the bracket 127 via the above-described bolt 133 and nut 134.

As shown in FIGS. 18 and 21, the attachment piece 136*a* of the protector 136 has a tongue piece 136*b* extending upward at its upper end. A connecting bracket 137 is attached by welding to the beltline reinforcement 106 so as to extend downward. This connecting bracket 137 and the above-described tongue piece 136*b* are connected with attachment members of a bolt 138, a nut 139 and the like.

Thus, the handle base 114 and the bracket 127 as the restricting member are fixed to the beltline reinforcement 106 via the protector 136 and the connecting bracket 137.

Figure 22:
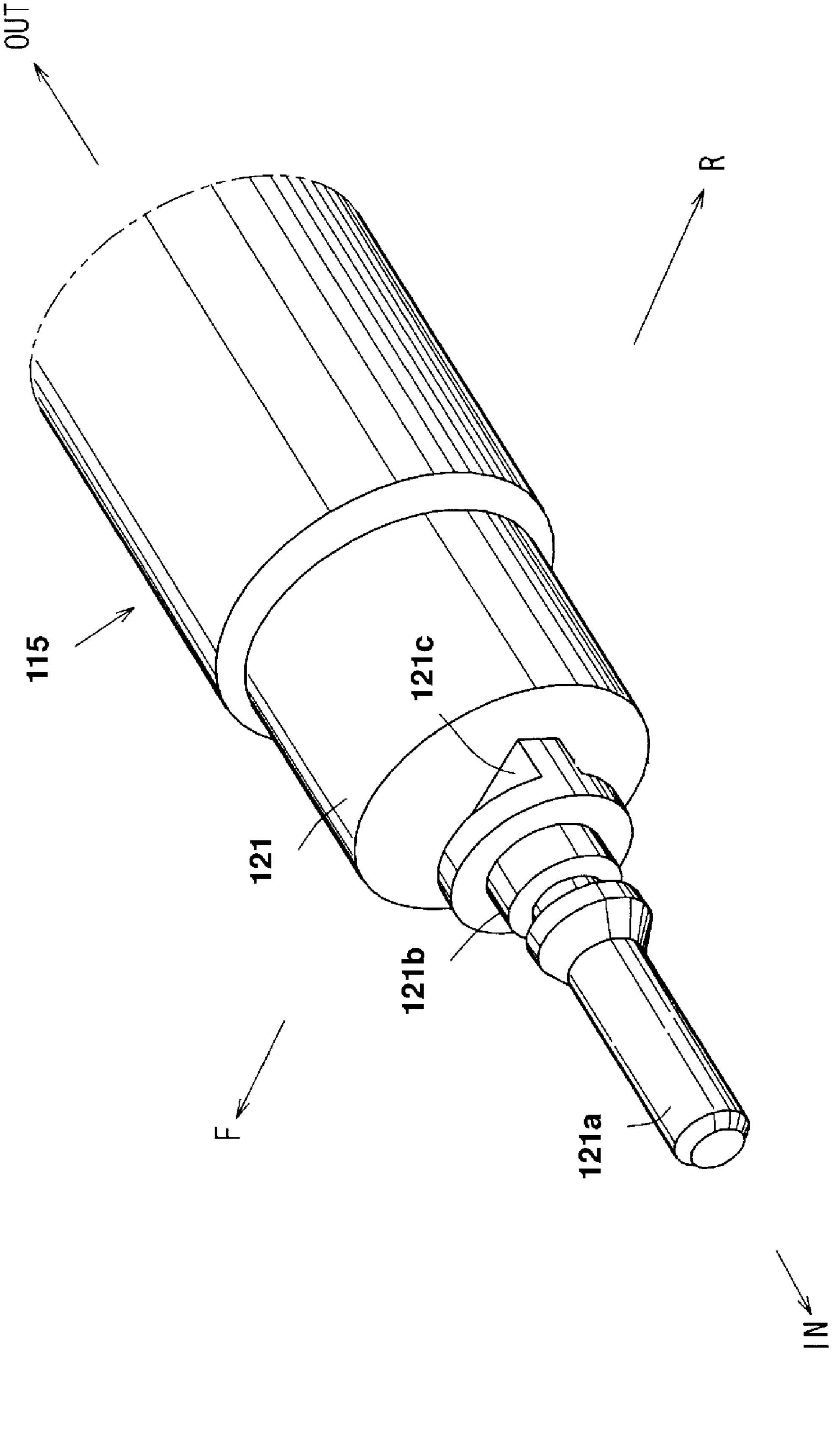
FIG. 22 is an enlarged perspective view of a major portion of the key cylinder.

Further, as shown in FIGS. 20 and 22, the cylinder portion 121 of the key cylinder 115 has a constricted portion 121*c* at its door-outside portion from a key-rod connection portion 121*b* (a portion engaging with the link 123). Thus, the key cylinder 115 is configured by this constricted portion 121*c* such that the rigidity of a key-cylinder portion that is located on a door-outer side from the key-rod connection portion 121*b* is smaller than the rigidity of the key-rod connection portion 121*b*. Thereby, when a relatively-large improper force acts on the key cylinder 115, the constricted portion

121*c* may be broken due to concentration of this force thereto, so that the key cylinder 115 and the door latch 116 can be disconnected.

Thus, the above-described constricted portion 121*c* is configured so as to surely convey the operation of the cylinder 121 to the link 123 at the normal operation of the key cylinder 115. Meanwhile, the above-described constricted portion 121*c* is configured so as to be broken easily at the improper operation of the key cylinder 115 in which the key cylinder 115 may be improperly moved vertically by the relatively-large improper force acting.

In the figures, a reference character 140 denotes a key-cylinder outer case that covers a vehicle-outside portion of the key cylinder 115. A reference character 141 denotes a door glass. A reference character 142 denotes a door sealing. A reference character 143 denotes a door trim. An arrow F indicates a vehicle forward direction, an arrow R indicates a vehicle rearward direction, an arrow IN indicates a vehicle inward direction, and an arrow OUT indicates a vehicle outward direction.

In the above-described door structure around the key cylinder of the automotive vehicle, by a passenger inserting a key (not illustrated) into a key slot of the cylinder portion 121 of the key cylinder and operating the cylinder portion 121 in the door-unlock direction, the key rod 117 is moved in the unlock direction via the link 123 engaging with the cylinder portion 121, so the door latch 116 is unlocked and the door 101 is opened (the proper unlock operation).

Meanwhile, in a case where the key cylinder 115 is moved vertically as shown by the arrow M by the improper operation from the vehicle outside, as shown in FIGS. 15 and 17, the projection portion 121*a* of the key cylinder 115 contacts the edge of the opening portion 128 of the restriction portion 127*e* of the bracket 127 and thereby the vertical movement shown by the arrow M of the projection portion 121*a* is restricted by the bracket 127. Further, the improper force acting on the bracket 127 can be properly received by the handle base 114 having its proper rigidity, so the movement of the key cylinder 115 can be prevented and thereby the door latch 116 can be prevented from being improperly unlocked.

According to the door structure around the door key cylinder of the automotive vehicle of the present embodiment, the door structure further comprises the key cylinder 115 that is supported at the handle base 114, the door latch 116 that is operative to lock or unlock the door 101, and the key rod 117 that connects the key cylinder 115 to the door latch 116, wherein the key cylinder 115 has the projection portion 121*a* that projects toward the inside of the door 101 at the inside end portion, and the bracket 127 as the restriction member to restrict the vertical movement of the projection portion 121*a* is attached to the handle base 114 (see FIGS. 13 and 16). According to the above-described structure, in a case where the key cylinder 115 is tried to be moved by the improper operation from the vehicle outside, the projection portion 121*a* of the key cylinder 115 contacts the bracket 127 and the vertical movement of the projection portion 121*a* is restricted by the bracket 127. Further, the outer force acting on the bracket 127 (by the improper operation) is received by the rigid handle base 114, so the improper movement of the key cylinder 115 can be prevented with the compact structure, thereby preventing the door latch 116 from being unlocked improperly. Herein, since the position of the key cylinder 115 may not be limited by the impact bars 107, 108 as shown in FIG. 12, the key cylinder 115 can be located at a proper location.

Further, the key cylinder 115 is configured such that the rigidity of the portion that is located on the door-outer side from the key-rod connection portion 121*b* is smaller than the rigidity of the key-rod connection portion 121*b* (see FIGS. 20 and 22). Thereby, since the rigidity of the portion of the key cylinder 115 that is located on the door-outer side from the key-rod connection portion 121*b* is smaller than the rigidity of the key-rod connection portion 121*b*, the portion located on the door-outer side from the key-rod connection portion 121*b* can be positively broken when the relatively-large improper force acts, so that the key cylinder 115 and the door latch 116 can be disconnected. Thus, the door latch 116 can be prevented from being improperly unlocked.

Also, the constricted portion 121*c* is formed at the portion that is located on the door-outer side from the key-rod connection portion 121*b*, whereby the rigidity of the portion located on the door-outer side from the key-rod connection portion 121*b* can be smaller than the rigidity of the key-rod connection portion 121*b* (see FIGS. 20 and 22). Thereby, the rigidity can be effectively made small with the simple structure by forming the constricted portion 121*c*.

Further, the restriction member (bracket 127) is attached to the handle base 114 at least at two locations (see the fastening portions of the screws 131, 132) that are above and below the key cylinder 115 (see FIG. 17). Thereby, the support rigidity of the restriction member (bracket 127) in the vertical direction can be increased.

Additionally, the extension portion 127*n* that extends so as to be close to the back face of the door outer panel 104 is formed integrally with the lower attachment portion 127*m* of the restriction member (bracket 127) (see FIG. 19). Thereby, since the extension portion 127*n* is close to the back face of the door outer panel 104, this extension portion 127*n* comes to contact the back face of the door outer panel 104 when the large outer force acts, thereby properly preventing the key cylinder 115 from being moved. Particularly, this may be effective for the improper unlocking by the improper operation that would vertically move the handle knob 113 itself of the door outer handle.

Also, the cover portions 127*g*, 127*j* that cover above the key rod 117 is formed integrally with a portion near the upper attachment portion 127*f* of the restriction member (bracket 127) (see FIG. 17). Thereby, the improper access to the key rod 117 from the upper side above the key rod 117 can be prevented with these cover portions 127*g*, 127*j*.

Further, the restriction member (bracket 127) includes the middle attachment portion 127*c* at the middle portion between the upper and lower attachment portions 127*f*, 127*m* (see FIG. 17). Thereby, since the restriction member (bracket 127) is attached to the handle base 114 at its middle attachment portion 127*c* in addition to its upper and lower attachment portions 127*f*, 127*m*, the attachment rigidity of the restriction member (bracket 127) to the handle base 114 can be further increased.

Also, the handle base 114 is fixed to the beltline reinforcement 106 so as to extend longitudinally along the beltline in the door 101 (see FIG. 21). Thereby, the attachment rigidity of the handle base 114 to the door 101 is increased, so that the support rigidity of the restriction member (bracket 127) with the handle base 114 can be further increased.

Embodiment 4

Figure 23:
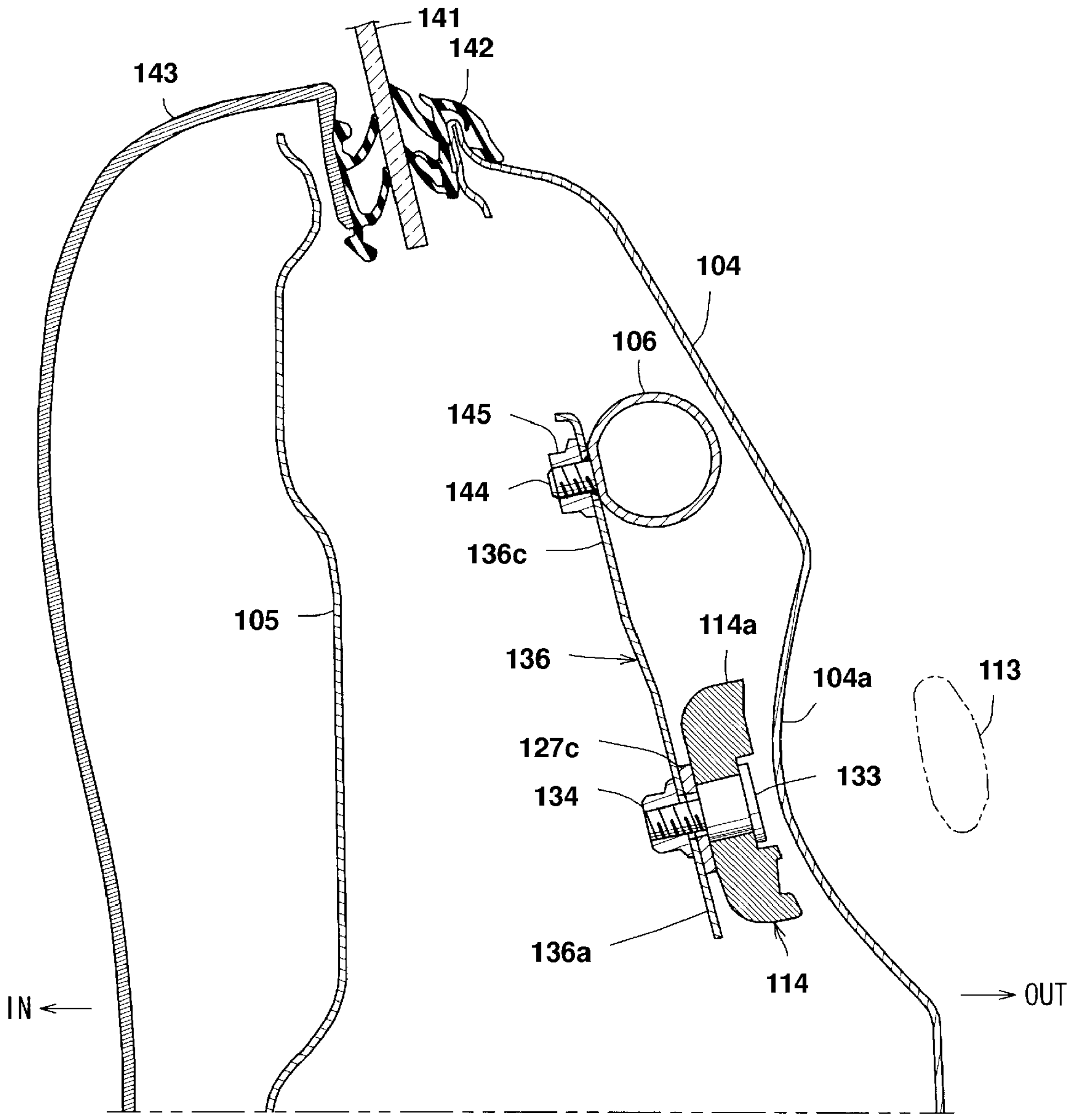
FIG. 23 is a sectional view of a door structure around the door key cylinder according to a fourth embodiment.

FIG. 23 shows further another embodiment of the door structure around the key cylinder of an automotive vehicle. In the previous embodiment shown in FIG. 21, the connecting bracket 137 is welded to the beltline reinforcement 106, and the tongue piece 136*b* of the protector 136 and the connecting bracket 137 are connected with the bolt 138 and nut 139. In the present embodiment shown in FIG. 23, however, an extension portion 136*c* that extends from the attachment piece 136*a* upward to a location corresponding to the beltline reinforcement 106 is integrally formed with the protector 136. Further, a bolt 144 is provided at the beltline reinforcement 106 so as to have its bolt axis in parallel to the one of the above-described bolt 133, and an upper end of the extension portion 136*c* of the protector 136 is attached to the beltline reinforcement 106 with this bolt 144 and its nut 145.

According to the present embodiment, the number of parts can be reduced compared to the embodiment shown in FIG. 23. Herein, since the present embodiment performs substantially the same functions and effects as the previous embodiment described above referring to FIGS. 12-22, the same components of the present embodiment are denoted by the same character references, whose specific descriptions are omitted.

The present intention should not be limited to the above-described embodiments, and any other modifications and improvements may be applied within the scope of a spirit of the present invention.

What is claimed is:

1. A door structure of an automotive vehicle, comprising:

a door outer panel;

a handle knob provided on an outer-face side of the door outer panel to conduct an opening/closing operation of a door;

a handle base provided on an inner-face side of the door outer panel to pivotally support the handle knob;

a door key cylinder supported at the handle base;

a door latch operative to lock or unlock the door, the door latch being operationally linked to the handle knob and the door key cylinder via respective transmitting members;

a beltline reinforcement provided on the inner-face side of the door outer panel to reinforce an beltline portion of the door outer panel;

a cover member to cover the transmitting members such that the transmitting members are hidden when viewed from an upper opening of the door, wherein said handle base is fixed to said cover member, and the cover member is fixed to said beltline reinforcement via an attaching bracket, and said door key cylinder has a projection portion which projects toward an inside of the door at an inside end portion thereof; and a restriction member having an opening portion through which an inner end of said projection portion extends is attached to said handle base such that a vertical movement of the projection portion of the door key cylinder is restricted by a contact of the projection portion with an edge of said opening portion of the restriction member.

2. The door structure of an automotive vehicle of claim 1, wherein said cover member includes a connecting portion to which said handle base is fixed, and said connecting portion of the cover member is fixed to said beltline reinforcement via said attaching bracket.

3. The door structure of an automotive vehicle of claim 2, wherein said cover member comprises a side wall portion that covers a vehicle-inside side portion of said transmitting members, a front wall portion that extends so as to bend outward from a front end of the vehicle-inside side portion and covers a vehicle-front side portion of the transmitting members, and an attachment piece portion that extends so as to bend forward from an outer end of the front wall portion and has a first attachment portion for the handle base and a second attachment portion for the beltline reinforcement, the attachment piece portion being connected to the front wall portion over the first and second attachment portions.

4. The door structure of an automotive vehicle of claim 2, wherein said beltline reinforcement is provided so as to extend in a longitudinal direction of the vehicle, a front end of which is connected to a front end portion of a door inner panel of the door, and a rear end of which is connected to a rear end portion of the door inner panel.

5. The door structure of an automotive vehicle of claim 4, wherein said beltline reinforcement is made of a pipe member.

6. The door structure of an automotive vehicle of claim 1, wherein said restriction member is attached to the handle base at least at two locations that are above and below the door key cylinder.

7. The door structure of an automotive vehicle of claim 6, wherein an extension portion that extends so as to be close to a back face of the door is formed integrally with a lower attachment portion of said restriction member.

8. The door structure of an automotive vehicle of claim 6, wherein a cover portion that covers above said key rod is formed integrally with a portion near an upper attachment portion of said restriction member.

9. The door structure of an automotive vehicle of claim 6, wherein said restriction member includes a middle attachment portion at a middle portion thereof.

* * * * *